(12) United States Patent
Sato et al.

(10) Patent No.: US 6,333,911 B1
(45) Date of Patent: Dec. 25, 2001

(54) DISK PLAYBACK APPARATUS DISK CHANGER DEVICE AND DISK MAGAZINE DEVICE

(75) Inventors: Nobuhiro Sato; Hideki Hayashi, both of Tokyo (JP)

(73) Assignee: Clarion Co. Ltd., Toda (JP)

( * ) Notice: Subject to any disclaimer, the term of this patent is extended or adjusted under 35 U.S.C. 154(b) by 0 days.

(21) Appl. No.: 09/015,714

(22) Filed: Jan. 29, 1998

(30) Foreign Application Priority Data

Mar. 31, 1997 (JP) .................................................. 9-080990

(51) Int. Cl.$^7$ .................................................. G11B 17/08
(52) U.S. Cl. .................................................. 369/192
(58) Field of Search .................................. 367/192, 75.1, 367/75.2, 77.1, 77.2

(56) References Cited

U.S. PATENT DOCUMENTS

| | | | |
|---|---|---|---|
| 4,413,289 | 11/1983 | Weaver et al. | 360/51 |
| 5,014,258 | * 5/1991 | Takemasa et al. | 369/178 |
| 5,265,081 | 11/1993 | Shimizume et al. | 369/48 |
| 5,274,620 | * 12/1993 | Sipos | 369/77.2 |
| 5,388,209 | 2/1995 | Akagiri | 395/2.38 |
| 5,726,967 | * 3/1998 | Tanaka et al. | 369/192 |
| 5,848,034 | * 12/1998 | Morioka et al. | 369/36 |
| 5,854,782 | * 12/1998 | Tamiya et al. | 369/192 |
| 5,903,538 | * 5/1999 | Fujita et al. | 369/178 |
| 6,031,811 | * 2/2000 | Umesaki et al. | 369/178 |

FOREIGN PATENT DOCUMENTS

| | | |
|---|---|---|
| 4408120 | 9/1994 | (DE) . |
| 284445 | 9/1988 | (EP) . |
| 366452 | 5/1990 | (EP) . |
| 575665 | 12/1993 | (EP) . |
| 658011 | 6/1995 | (EP) . |
| 684606 | 11/1995 | (EP) . |
| 724261 | 7/1996 | (EP) . |
| 729146 | 8/1996 | (EP) . |
| 265809 | 10/1996 | (EP) . |
| 816172 | 1/1998 | (EP) . |
| 2266617 | 11/1993 | (GB) . |
| 4010266 | 1/1992 | (JP) . |
| 9528342 | 10/1995 | (WO) . |
| 9723114 | 6/1997 | (WO) . |

* cited by examiner

Primary Examiner—Brian E. Miller
Assistant Examiner—Tod Kupstas
(74) Attorney, Agent, or Firm—Price and Gess

(57) ABSTRACT

A disk playback apparatus such as a CD player comprises a case and a lift unit which is supported to be movable in the vertical direction to the case. The lift unit comprises a playback unit, a turntable, a holder drawing member, and the like. A magazine which is adapted to be loaded in the case accommodates therein disk holders, each of which hold one of different-sized disks. A control link having a holder butting pin and a disk control pin is movably mounted on the playback unit which is urged in the direction of departing from the disk by means of a release spring. When the disk holder reaches its accommodation position, the disk holder butts against the holder butting pin and rotates the control link slightly, thereby the disk control pin compulsively corrects the position of the disk. Thus the disk is certainly transported to the normal chucking position on the playback unit irrespective of the disk accommodated state in the disk holder.

7 Claims, 27 Drawing Sheets

DISK PLAYBACK APPARATUS DISK CHANGER DEVICE AND DISK MAGAZINE DEVICE

BACKGROUND OF THE INVENTION

1. Field of the Invention

The present invention relates to a disk playback apparatus, and particularly relates to a structure for certainly transporting a disk to a normal chucking position on a playback means. The present invention also relates to a disk changer device and a disk magazine device which are preferable for use in such a disk playback apparatus.

2. Description of the Related Art

Recently, a disk apparatus such as a CD (Compact Disk) player of the type wherein a magazine adapted to accommodate a plurality of disks is loaded therein and a disk selected by a user from the plural disks is automatically selected and played thereby is increasing from a standpoint of improving a sense of use by simplifying disk exchange operations of the user as far as possible. In order to reproduce plural disks sequentially at a common disk playback section for reproducing information recorded on each of the disks, the disk apparatus such as mentioned above is configured to fetch a desired disk from the loaded magazine, transport the disk to playback means, and return the disk into the magazine after completion of the reproduction.

Particularly, some of the above mentioned disk apparatuses employ a system using a magazine which accommodates plural disk holders, each of which holds therein one disk, in an arrangement where respective holders can be drawn out independently, and performing a loading operation of a disk from the inside of the magazine to the playback position and an ejecting operation of the disk from the playback position into the magazine by simply moving back and forth the holder. In the disk apparatus based on this system, the disk holder holding therein a selected disk is transported to a position nearby the disk playback section by the moving forth operation, and returned into the magazine by the moving back operation after the disk is received in a predetermined playback position. In order to eject a disk when exchanging the disk with another one, when the magazine is ejected, or the like, the empty disk holder is transported to a position nearby the disk playback section with the moving forth operation, then the disk holder is returned into the magazine with the disk held therein by the moving back operation after the disk at the playback position is recovered in the holder.

FIG. 28 is a flowchart for explaining operating procedures of the disk playback apparatus having the system such as mentioned above by way of example. As shown in FIG. 28, when a magazine is inserted (Step 110), disk checking operation for determining existence of a disk is carried out using some appropriate processes (Step 120). Subsequently, if a user instructs to reproduce the disk (Step 130), then the disk holder accommodating therein the disk corresponding to the playback instruction is drawn out from the magazine and transported to a loading position nearby a playback unit, thereby the disk held in the disk holder is transported to a predetermined chucking position on the playback unit (Step 140), then the disk is chucked at he chucking position on the playback unit (Step 150), only the empty disk holder is returned into the magazine (Step 160), and the disk is reproduced (Step 170).

If an instruction to reproduce another disk is directed by the user during Step 170 of reproducing the disk (Step 180), then the empty holder for the disk in reproduction is drawn out from the magazine (Step 190), the disk in reproduction is inserted into this empty disk (Step 200), and the disk holder accommodating therein the disk is returned into the magazine (Step 210), then control returns to Step 140 for drawing out the disk holder in which the specified another disk is accommodated.

If an instruction to eject the magazine is directed by the user during Step 170 of reproducing the disk (Step 220), then the empty holder corresponding to the disk in reproduction is drawn out from the magazine (Step 230), the disk in reproduction is inserted into this empty disk (Step 240), and the disk holder accommodating therein the disk is returned into the magazine (Step 250), then the magazine is ejected (Step 260).

In the conventional disk playback apparatus as in the foregoing, the disk holder is typically transported by using a holder drawing member which can reciprocate in the horizontal direction, and moving the holder drawing member by engaging a fingernail-shaped projection disposed on the holder drawing member with an engaging section disposed at one end of the disk holder. During transporting the disk holder as mentioned above, if the disk is not sufficiently inserted into the disk holder or the disk is displaced from the normal accommodation position of the disk holder, when the disk holder reaches a normal loading position of the playback means, the disk is displaced from the normal chucking position on the playback means.

In this case, subsequent disk chucking operation can not be properly performed, which may induce a poor chucking condition. If disk reproduction operation is carried out under such bad chucking conditions as mentioned above, the quality of the disk reproduction may become poor. Further, as the disk can not be sufficiently inserted into the disk holder when recovering the disk into the disk holder, there is a possibility that the disk can not be recovered.

The abovementioned operations of loading a disk into the playback position or ejecting a disk into the magazine in the disk playback apparatus are both performed by a device called "disk changer".

By the way, in the magazine for use in the conventional disk changer as in the foregoing, disk holders are inserted from an aperture of the magazine into a predetermined accommodation position within the magazine. At this time, if the insertion is insufficient, the holder may be accommodated in the magazine with the holder protruding outward beyond the predetermined accommodation position. When the disk holder protrudes outward beyond the predetermined accommodation position of the disk holder, it can become impossible to transport the disk holder.

Thus, in the case that the disk holder is transported by engaging a fingernail-shaped projection provided at the holder drawing member with an engaging section provided on one end of the disk holder as mentioned above, the projection of the holder drawing member is disposed to meet the position of the engaging section of the disk holder stored in a predetermined accommodation position within the magazine. Therefore, if the disk holder protrudes outward beyond the predetermined accommodation position in the magazine, the engaging section can not be engaged with the protrusion of the holder drawing member, and it can become impossible to transport the disk. Alternately, a part of the disk holder protruding outward improperly engages with the holder or any other part of the mechanism, which may results in subsequent defective performance. There exist the abovementioned disadvantages similarly when using the magazine which accommodates a disk tray of the type of placing thereon a disk as well as when using the magazine which accommodate a disk holder of the type of holding a disk as a disk holding unit.

Among various types of conventional disk changer devices, some disk changer devices in which the loading direction of the magazine and the drawing-out direction of the disk holder are same are specifically called as "end loading type disk changer device".

FIG. 27 is a plan view showing an end loading type on-vehicle disk changer device by way of example. As shown in FIG. 27, a magazine 202 which is inserted through a magazine insertion opening L is loaded in a magazine loading position which is disposed in the left hand part of the figure in the chassis 201 of the disk changer device. The magazine 202 accommodate plural disk holders 203 which are arranged in a vertical stack. Each disk holder 203 accommodates one disk which is inserted thereto in the direction parallel to the main surface of the disk holder 203, and slidably loaded into the magazine 202. An engaging section 203a for drawing out the disk holder 203 is disposed at one end of the disk holder 203.

A lift unit 205 is disposed in the chassis 201 of the device as shown in the right-hand part of the figure and supported to be movable in the vertical direction with respect to the chassis 201. The lift unit 205 is a combination of a holder drawing member 206 for drawing out the disk holder 203 and a playback unit 207 for reproducing a disk 204.

Among these components, the holder drawing member 206 is mounted on a chassis not shown of the lift unit 205 to be movable in the disk transporting direction, i.e. a horizontal direction in the figure, and a fingernail-shaped projection 203a which engages with the engaging section 203a is provided at one end of the holder drawing member 206.

The lift unit 205 is moved upward or downward according to a disk selection instruction in order to adjust the height of the holder drawing member 206 to be flush with the disk holder 203 accommodating therein the selected disk 204. On the other hand, the playback unit 207 comprises a drive plate 209 having a rotatable turntable 208 on which the disk 204 is mounted, a clamp arm 210 for chucking the disk 204 on the turntable 208, and the like.

The chassis 201 of the device is contained in an outer case 211, supported against the outer case 211 via a damper 212, and therefore provides a structure which enables isolation from the vehicle vibrations.

By the way, the disk changer device shown in FIG. 27 as described in the foregoing transports the disk holder 203 by engaging the engaging section 203a of the disk holder 203 with the fingernail shaped projection 206a of the holder drawing member 206 and moving the holder drawing member 206 rightward in figure. During transporting the disk holder 203 as mentioned above, in the case that the disk 204 is insufficiently inserted into the disk holder 203 and the disk 204 protrudes beyond the normal accommodation position in the disk holder 203, the disk 204 is displaced from the normal chucking position if the disk holder 203 reaches the normal loading position of the playback unit 207.

In this case, subsequent disk chucking operation may not be properly performed, which may induce a poor chucking condition. If disk reproduction operation is carried out under such bad chucking conditions as mentioned above, the quality of the disk reproduction may be degraded. Further, when recovering the disk 204 into the disk holder 203, there is a possibility that the disk 204 can not be sufficiently inserted into the disk holder 203 and, as a result, the recovery is failed.

Particularly, as shown in FIG. 27, compared with the other type disk changer devices, the end loading type disk changer device in which the loading direction of the magazine 202 and the drawing direction of the disk holder 203 is identical has a higher possibility that the disk 204 accommodated in the disk holder 203 or the disk holder 203 is popped out from the magazine 202 when the magazine 202 is forcefully inserted into the device. And at worst, it is thought that inconvenience such that the popped-out disk from the magazine 202 is dropped in the device is thought.

SUMMARY OF THE INVENTION

Accordingly, a first object of the present invention is to provide a highly reliable disk playback apparatus in which a disk can be certainly transported to a normal chucking position in playback means even if the disk is not accommodated in a normal accommodation position in a disk holder.

In order to achieve the above object, in accordance with a first aspect of the present invention, a disk can be certainly transported to a normal chucking position of playback means irrespective of the accommodated condition of a disk in a disk holder by providing on the playback means a movable control member which can control the disk with respect to a normal chucking position using the butting against a disk holder That is, a disk playback apparatus in accordance with the first aspect of the present invention comprises a disk holder for accommodating therein a disk holder, playback means for reproducing a disk, and holder movement control means for drawing out the disk holder from an initial position thereof to a loading position near the playback means, chucking a disk accommodated in the disk holder to the playback means, and returning the disk holder to the initial position, wherein the playback means comprises a rotatable control member and an urging means as described below.

More specifically, the rotatable control member is a rotatable member for controlling the disk which is accommodated in this disk holder with respect to the normal chucking position by using the butting against the disk holder, and the urging means is the means for urging the rotatable control member in the direction departing from the disk, wherein the rotatable control member comprises a disk control section and a holder butting section. The disk control section which is disposed at one end of the rotatable control member controls the disk with respect to said normal chucking position, while the holder butting section which is disposed at the other end of the rotating control section butts against the disk holder. The rotatable control member is pressed by this disk holder via the holder butting section when the disk holder is drawn out to the loading position, and thereby held at a disk control position corresponding to the diameter of the disk accommodated in this disk holder, and thus allows the disk control section to control the disk with respect to the normal chucking position at this disk control position.

In accordance with the first aspect of the present invention having a configuration in the foregoing, when the disk holder having therein a disk is drawn out to the loading position, a rotatable control member is pressed by this disk holder and held at a disk control position, therefore the rotatable control member can control the disk with respect to the normal chucking position. That is, even if the disk is not accommodated in the normal accommodation position in the disk holder, the disk position can be corrected by the rotatable control member at the time when the disk holder is drawn to the loading position. Accordingly, the disk can be certainly transported to the normal chucking position irrespective of the accommodated condition of the disk in the disk holder.

In accordance with a preferred form of the first aspect of the present invention, the disk holder and the rotatable control member are configured as described below. As disk holders, plural types of disk holders are provided, each of which can accommodate one of plural different-sized disks which are different in diameter. The rotatable control member is configured to control each of the different-sized disks with respect to the normal chucking position by the disk control section at each of the plural disk control positions corresponding to each of the different-sized disks. Each of the plural types of disk holders is provided with a butting section which butts against the holder butting section of the rotatable control member and presses the same when the disk holder is drawn to the loading position, and holds the rotatable control member at the disk control position corresponding to the accommodated disk size.

In accordance with the preferred form as mentioned above, for each of plural types of disk holders, each of which accommodate one of plural different-sized disks, the rotatable control member is pressed by the disk holder and held at each of disk control positions corresponding to each disk size when the disk holder is drawn out to the loading position. Thus each of the different-sized disks can be controlled with respect to the normal chucking position by the rotatable control member at each of the plural disk control positions. Therefore, the plural different-sized disks can be certainly transported to the normal chucking position by a common rotatable control member irrespective of the accommodated condition of the disk.

A second object of the present invention is to provide a disk changer device which can certainly transport a disk holding unit to a predetermined position near playback means even if the disk holding unit is not located at a predetermined accommodation position in a magazine. A third object of the present invention is to provided a disk changed which can prevent a operational malfunction when the disk holding unit is not located at a predetermined accommodation position in the magazine.

In order to attain these objects, a disk changer device in accordance with a second aspect of the present invention ensures that a disk holding unit is certainly transported to a predetermined position near playback means by pressing the disk holing unit into a predetermined accommodation position, or ensured to prevent a malfunction during operation of transporting the disk holding unit or subsequent operation of reproducing a disk by performing the motion control for canceling to proceed to the reproduction operation.

The basic configuration of the disk changer device in accordance with the second aspect of the present invention comprises playback means for reproducing a disk, a magazine accommodation section which accommodates a magazine which accommodates plural disk holders, each of which holds therein one disk, in an arrangement where respective disk holding unit can be drawn out independently, and which has an aperture through which the respective plural disk holding units are drawn out, and drawing members for drawing the disk holding units from the magazine which is loaded in the magazine accommodation section to a position in the proximity of the playback means.

A first preferred form of the disk changer in accordance with the second aspect of the present invention is configured to mechanically press an end face of the disk holding unit by an edge of the magazine insertion opening when inserting a magazine. That is, the magazine accommodation section has a magazine insertion opening which is provided to allow the magazine to be inserted toward the aperture side of the magazine. The edge of the magazine insertion opening is configured to control the position of the end face of the disk holding unit loaded in the magazine when the magazine is inserted through this magazine insertion opening.

In accordance with the disk changer device having the abovementioned configuration, if the magazine is inserted in the magazine accommodation section through the magazine insertion opening in the state that the disk holding unit in the magazine protrudes outward beyond the predetermined accommodation position, the end face of the protruding disk holding unit is pressed toward the inside of the magazine by the edge of the magazine insertion opening, therefore the disk holding unit is mechanically pressed into the predetermined accommodation position in the magazine. Accordingly, the disk holding unit in the magazine can be easily and certainly accommodated in the predetermined accommodation position by just inserting the magazine into the magazine accommodation section.

The disk changer apparatus may be configured so that the disk holding unit comprises a sloped surface which is inclined from the end face in the direction inserting the magazine, and that the disk holding unit controls the position of the sloped surface prior to the end face of the protruding disk holding unit when the magazine is inserted into the magazine insertion opening in the state that the disk holding unit in the magazine protrudes outward beyond the predetermined accommodation position.

In the operation of the disk changer device having such configuration, the sloped surface of the protruding disk holding unit is first pressed toward the inside of the magazine by the edge of the magazine insertion opening when the magazine is inserted through the magazine insertion opening in the state that the disk holding unit in the magazine protrudes relatively a lot, therefore the disk holding unit is smoothly and fully pressed in the magazine toward the predetermined accommodation position thereof based on the angle of the sloped surface. Then, the end face of the disk holding unit is pressed toward the inside of the magazine by the edge of the magazine insertion opening, thereby the disk holding unit is properly accommodated in the predetermined accommodation position in the magazine.

The disk changer device of the first preferred form may have attraction means for retracting the disk holding unit to the predetermined accommodation position in the magazine when the magazine is inserted to a position back from the predetermined accommodation position in the magazine.

When the attraction means as mentioned above is provided, if the disk holding unit is pressed into the magazine to some extent by the edge of the magazine insertion opening, then the disk holding unit can be moved to the predetermined accommodation position by the attraction means. Therefore, it is not necessary to press the disk holding unit into the predetermined accommodation position in the magazine by the edge of the magazine insertion opening, and the dimensional accuracy required between the magazine insertion opening and the disk holding unit can be relaxed.

Further, the disk changer device in accordance with he first preferred form may be configured so that the aperture of the magazine is typically corresponding to the end face of the disk which is held in the disk holding unit when the disk holding unit in the magazine is located at the predetermined accommodation position, and configured the edge of the magazine insertion opening controls the position of the end face of the disk held in the disk holding unit in the magazine when the magazine is inserted through this magazine insertion opening.

In accordance with the configuration as mentioned above, if the disk holding unit in the magazine is protruding, the position of the disk held in the protruding disk holding unit by the edge of the magazine insertion opening, thereby the disk holding unit accommodating this disk is pressed inward until it reaches the predetermined accommodation position. Thus, the improper accommodation of the disk holding unit can be also subsidiary corrected by a disk.

A second preferred form of the disk changer device in accordance with the second aspect of the present invention is configured as follows. When it is determined that the disk holding unit in the magazine protrudes outward beyond the predetermined accommodation position, the disk holding unit is pressed into the predetermined accommodation position in the magazine based on this determination. That is, the second preferred form of the disk changer device features having protrusion determination means for determining whether the disk holding unit in the magazine protrudes outward beyond the predetermined accommodation position, and pressing means for pressing the disk holding unit into the magazine when the protrusion of the disk holding unit is determined by the protrusion determination means.

In accordance with the second preferred form of the disk changer device having the configuration such as mentioned above, when the magazine is inserted into the magazine accommodation section in the state that the disk holding unit in the magazine protrudes outward beyond the predetermined accommodation position, such protrusion of the disk holding unit can be properly determined by the protrusion determination means, and thus the disk holding unit can be certainly pressed into the predetermined accommodation position in the magazine by the pressing means based on the result of the determination.

In a second preferred form of the disk changer device, the drawing means may be also used as the pressing means. When the drawing means for drawing out the disk holding unit is used as the pressing means as it is, alignment with the disk holding unit is easy, operational reliability is good, and the configuration thereof can be simplified compared with the case that the dedicated pressing means is provided.

A third preferred form of the disk changer device in accordance with the second aspect of the present invention is configured as follows. When it is determined that the disk holding unit in the magazine protrudes outward beyond the predetermined accommodation position, transferring to the subsequent operation is canceled. That is, the third preferred form of the disk changer device features having protrusion determination means for determining whether the disk holding unit in the magazine protrudes outward beyond the predetermined accommodation position, and control means for position controlling to stop proceeding to the disk playback operation by the playback means when the protrusion of the disk holding unit is determined by the protrusion determination means.

In accordance with the third preferred form of the disk changer device having the configuration as mentioned above, when the magazine is inserted into the magazine accommodation section in the state that the disk holding unit in the magazine protrudes outward beyond the predetermined accommodation position, such protrusion of the disk holding unit can be properly determined by the protrusion determination means, and thus transferring to the disk playback operation is canceled based on the result of the determination, thereby failure reproduction caused by protrusion of the disk holding unit can be prevented.

The third preferred form may be configured to further comprise ejecting means for ejecting the magazine accommodated in the magazine accommodation section and be configured so that the control means allows the ejecting means to eject the magazine accommodating therein the disk holding unit from the magazine accommodation section when the protrusion determination means determines the protrusion of the disk holding unit.

The disk changer device having the configuration as mentioned above can eject the magazine in its entirety including the protruding disk holding unit from the magazine accommodation position based on the determination result of the protrusion determination means if the disk holding unit protrudes beyond the predetermined accommodation position. Accordingly, a malfunction resulting from the protrusion of the disk holding unit can be certainly prevented and it is possible to inform the user of the fact that the disk holding unit is improperly accommodated.

The third preferred form of the disk changer device of the present invention may be configured to further comprise an output means for supplying a signal for giving some information to the user and be configured to allow an output means to supply a signal which indicate the improperly accommodated state of the disk holding unit when the protrusion determination means determines the protrusion of the disk holding unit.

When the configuration such as mentioned above is employed, the disk holding unit protrudes beyond the predetermined accommodation position in the magazine, control cancels to transfer to the disk playback operation based on the result of the determination of the protrusion determination means, thereby reproduction failure caused by protrusion of the disk holding unit can be prevented and it also possible to supply a signal indicating the improper accommodation of the disk holding unit in order to inform the user of the fact that the disk holding unit is improperly accommodated.

In the third preferred form of the disk changer device of the present invention, the drawing means and the protrusion determination means may be configured as follows. The drawing means is provided to be vertically movable with respect to the plural disk holding unit in the magazine which is accommodated in the magazine accommodation section, and configured to align with one of disk holding units by the vertical motion. On the other hand, the protrusion determination means is configured to determine that the disk holding unit which is located at the position where trouble occurs is protruding when trouble occurs on the vertical motion of the drawing means.

When the drawing means and protruding means as mentioned above are used, the protrusion of the disk holding unit can be easily and properly determined by a simple mechanical detection method using the drawing means which is existing means for drawing a disk holding unit, and the configuration can be simplified compared with the case that the dedicated protrusion determination means is provided.

Beside, in the third preferred form of the disk changer device of the present invention in the foregoing, a specific configuration of the protrusion determination member can be selected in optional, and the determination of the disk holding unit is not limited to mechanical determination method, various existing position detection methods such as optical detection method, electromagnetic detection method, or the like may be optionally used by itself or in combination.

A fourth object of the present invention is to provide a highly reliable disk changer device wherein popping out of the disk from the magazine when the magazine is loaded can be prevented.

Further, a fifth object of the present invention is to provide a highly reliable disk magazine device wherein popping out of the disk from the disk holding unit when accommodating into the magazine can be prevented.

In order to attain the objects as mentioned above, in accordance with a third aspect of the present invention, popping out of a disk from a magazine or a disk holding unit can be prevented by providing a disk control member for controlling the disk with respect to a normal accommodation position near a magazine accommodation section in the disk changer device, or by providing a disk control member for controlling the disk with respect to a normal accommodation position in the disk holding unit which is accommodated in the body of the magazine.

The disk changer device in accordance with the third aspect of the present invention comprises a magazine loading section in which a magazine for slidably accommodating plural disk holders, each of which holds therein or thereon one disk, in an arrangement where respective holding unit can be drawn out independently, can be loaded in the sliding direction of the disk holding unit, and a fixed section which contains the magazine loading section. The magazine loading section comprises a disk holding unit drawing section for drawing disk holding unit from the magazine which is loaded in the magazine loading section, moving means for moving the disk holding unit drawing member in the arranging direction of the disk holding units in the magazine to the fixed section, and a disk playback section for reproducing a disk held in or placed on the disk holding unit which is drawn out by the disk holding unit drawing section. In addition to the configuration as mentioned above, the disk changer device features further comprising a disk control member as in the following. A disk control member, for controlling the disk with respect to the normal accommodation position using the disk's side face or the disk holding unit's side face, is disposed at a position which becomes near the disk's side face on the drawing direction side in the case that the magazine loaded in the magazine loading section is located at its normal position, and the disk accommodated in the magazine is located at its normal accommodation position. The disk control member is provided as a link which links between one of upper and lower ends of the fixed section with a portion of the disk holding unit to be movable between the control position where the disk accommodated in the magazine is controlled with respect to the predetermined accommodation position and the release position where the disk is allowed to be drawn from each disk holder, in accordance with the position of the disk holding unit drawing member. Further, the disk control member is configured to be located at the control position when the disk holding unit drawing section is disposed at either upper or lower position.

A disk changer device in accordance with the third aspect of the present invention having such characteristics as mentioned above offers advantages as in the following. Generally, a disk holding unit drawing section is located at a lowermost position or an uppermost position within the lift operating range at its initial condition before loading a magazine. Therefore, by providing the disk control member as a link for linking between the upper end of the fixed section and the disk holding unit drawing section when the disk holding unit drawing section is located at the lowermost position in the initial condition, and as a link for linking between the lower end of the fixed section and the disk holding unit drawing section when the disk holding unit drawing section is located at the uppermost position in the initial condition, the disk control member is located at the control position and vertically compart the side of the loaded magazine on the drawn side. In such state as mentioned above, if the magazine is forcefully inserted into the disk changer device and the disk or disk holding unit is nearly popped out from the magazine, the side of the disk or the side of the disk holding unit butts against the disk control member, therefore the disk can not be popped out from the magazine.

When reproducing the disk, the disk holding unit drawing section moves from the uppermost or lowermost initial position to the position of disk holding unit which accommodates therein a selected disk. In synchronization with this movement, the disk control member moves to a release position to allow at least disk holding unit to be drawn out, thereby smooth disk loading operation is ensured.

In the abovementioned disk changer device in accordance with the third aspect of the present invention, the disk holding unit drawing section may be integrated with the disk playback section. When such an integrated configuration is employed, the disk control member may be provided as a link for linking between the fixed section and the disk playback section, therefore, flexibility in the arrangement of the disk control member becomes high, which will result in a simplification of the configuration.

In the disk changer device in accordance with the third aspect of the present invention, the moving member may be configured to eject the magazine from the magazine loading section when the disk holding unit drawing section reaches either the uppermost or lowermost position.

When the configuration as mentioned above is employed, the disk can be controlled to the normal accommodation position in the magazine by the disk control member while ejecting the magazine, therefore, protrusion or dropping out of the disk during ejecting the magazine can be prevented.

In accordance with the fourth aspect of the present invention, a disk magazine device having the configuration as in the following is provided. The disk magazine device of the present invention comprises a disk holding unit for holding a disk, and a magazine body for slidably accommodating the plural disk holders, wherein further comprising a disk control member and the control section thereof as in the following. The disk holding unit comprises a disk control member which controls the disk with respect to the normal accommodation position using the side face of the disk, which is provided at a position which becomes near the disk's side face on the drawing direction side when the disk held in or placed on the disk holding unit is located in the normal accommodation position. The disk control member is provided to be movable between a control position where the disk accommodated in the magazine is controlled with respect to the normal accommodation position and a release position where the disk is allowed to be drawn from each disk holder. Further, the magazine body comprises a control section for controlling the disk control member with respect to the control position when accommodating the disk holding unit.

In accordance with the magazine device in accordance with the present invention having the configuration as mentioned above, in the state that the disk holder holding therein or thereon a disk is accommodated in the magazine body, the disk control member is controlled with respect to the control position by the control section, therefore the disk is controlled by the disk control member with respect to the normal accommodation position using the side thereof. Accordingly, if the disk is nearly popped out from the disk holding unit, the side of the disk butts against the disk control member which is controlled with respect to the control position, therefore the disk can not be popped out from the magazine.

The disk magazine device in accordance with the present invention as in the foregoing may further comprise an urging means which urges the disk control member to the release position.

If the urging means such as mentioned above is used, the control member can be certainly moved to the release position by the urging means when the disk holding unit is drawn out from the magazine when reproducing the disk, therefore smooth disk loading operation is ensured.

The above and other objects, features and advantages of the present invention will become apparent from the following detailed descriptions of illustrative embodiments thereof to be read referring to the accompanying drawings.

DESCRIPTION OF THE PREFERRED EMBODIMENTS

A concrete description will now be given to one preferred form wherein the present invention is applied to a disk playback apparatus for a 5-inch disk and a 3.5 inch disk referring to FIG. 1 to FIG. 6. In the specification, FIG. 1 is a plan view schematically showing a disk playback apparatus of the present form, especially showing the initial state that a 5-inch disk is improperly accommodated.

Figure 1:
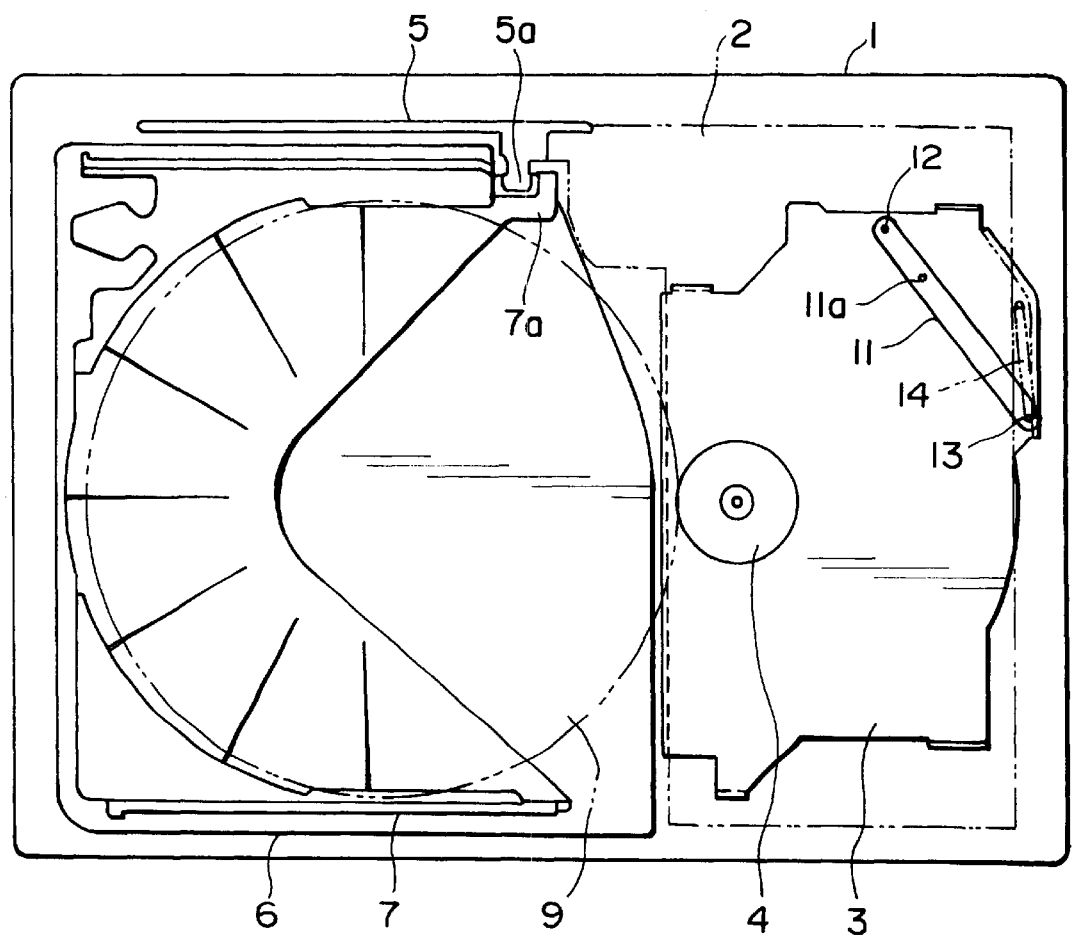
FIG. 1 is a plan view of one form of a disk playback apparatus in accordance with the present invention, especially showing an initial state in the case that a 5-inch disk is improperly accommodated.
Figure 2:
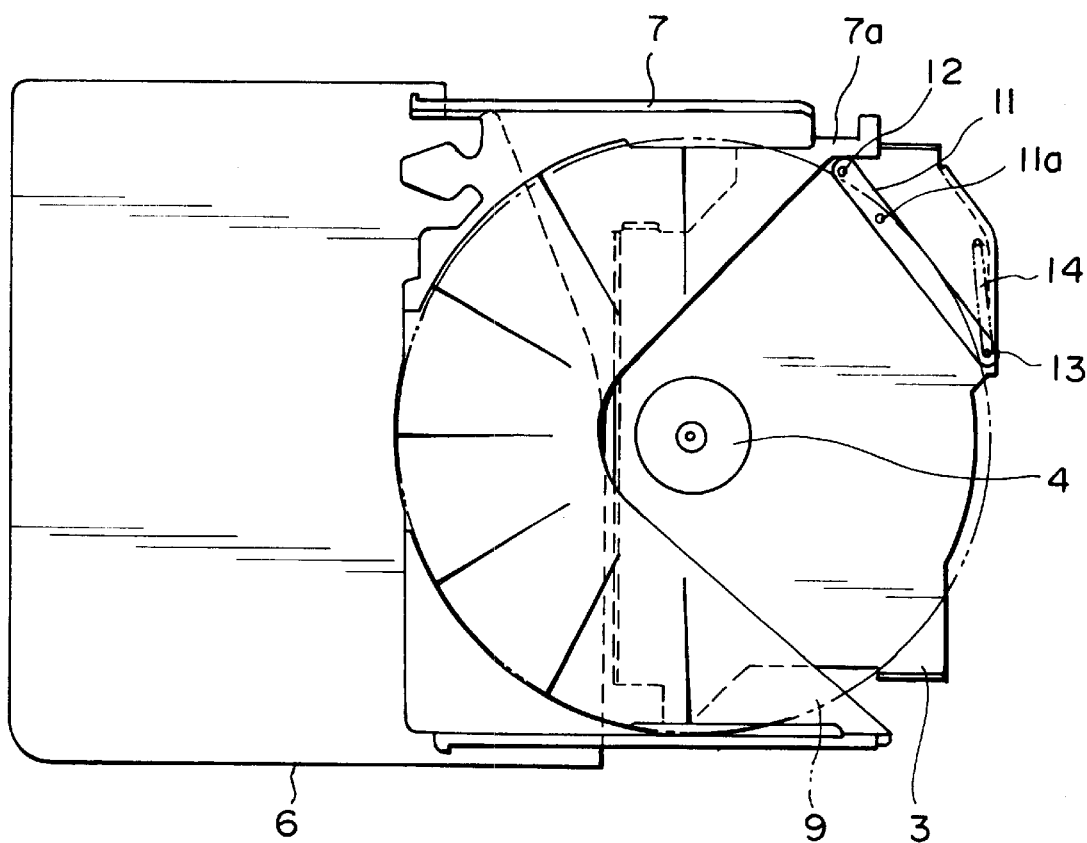
FIG. 2 is a plan view of a disk holder and playback unit of the disk playback apparatus shown in FIG. 1, especially showing a state the position of the 5-inch disk is corrected after the state shown in FIG. 1.
Figure 3:
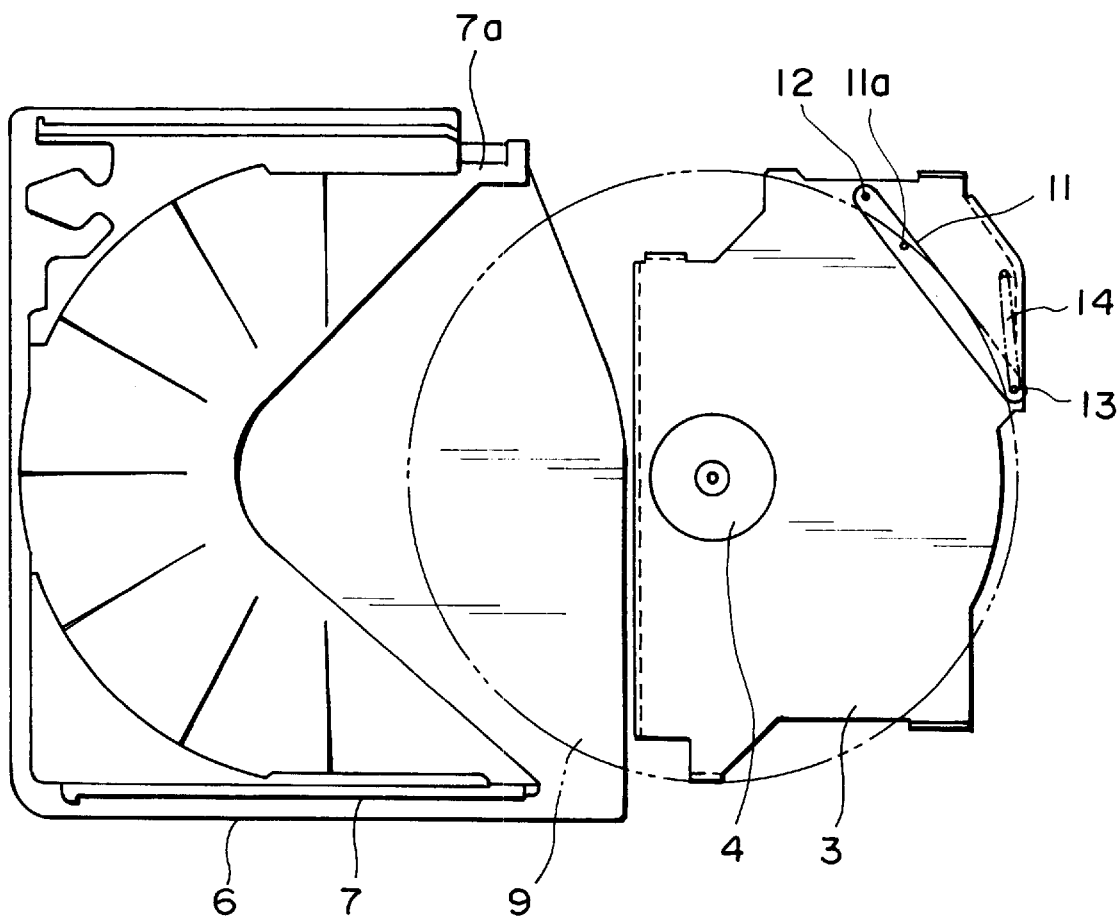
FIG. 3 is a plan view of the disk holder and playback unit of the disk playback apparatus shown in FIG. 1, especially showing a state of reproducing the disk of the 5-inch disk after the state shown in FIG. 2.
Figure 4:
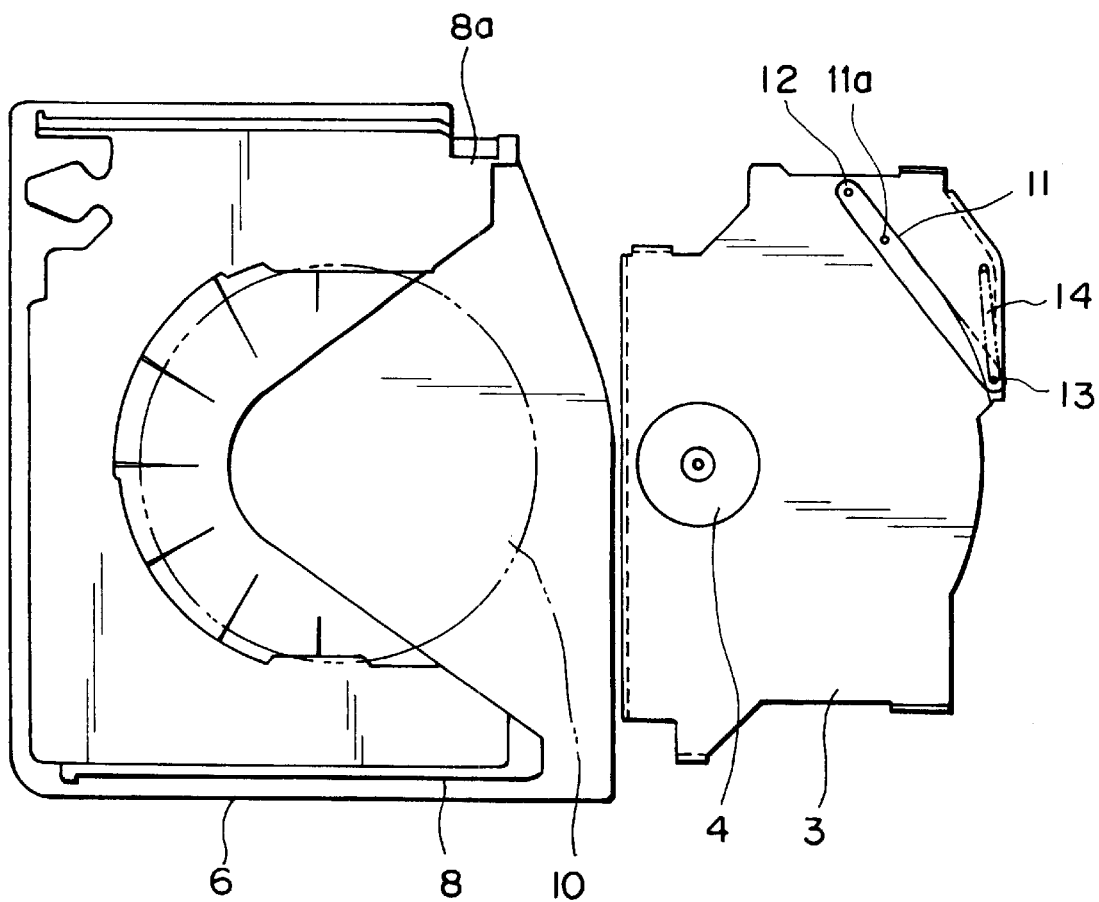
FIG. 4 is a plan view of the disk holder and playback unit of the disk playback apparatus shown in FIG. 1, especially showing an initial state in the case that a 3.5-inch disk is in the state of improperly accommodated.
Figure 5:
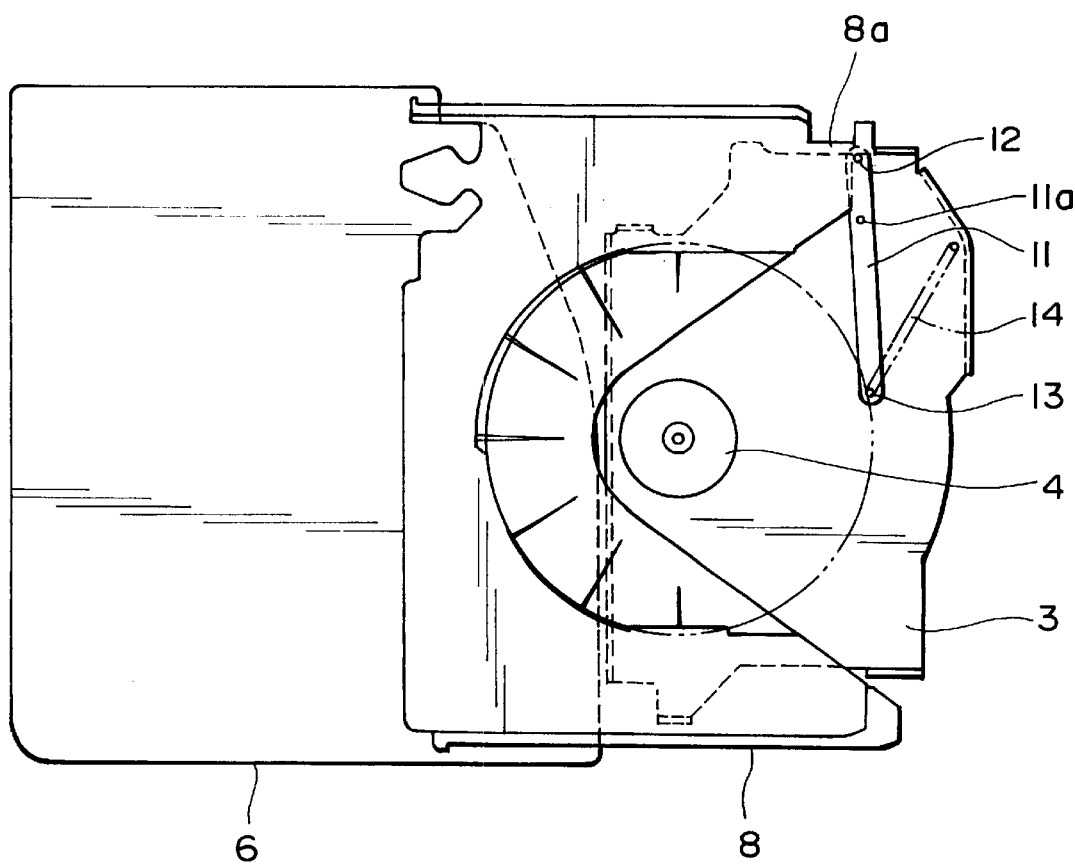
FIG. 5 is a plan view of the disk holder and playback unit of the disk playback apparatus shown in FIG. 1, especially showing a state that the position of the 3.5-inch disk is corrected after the state shown in FIG. 4.
Figure 6:
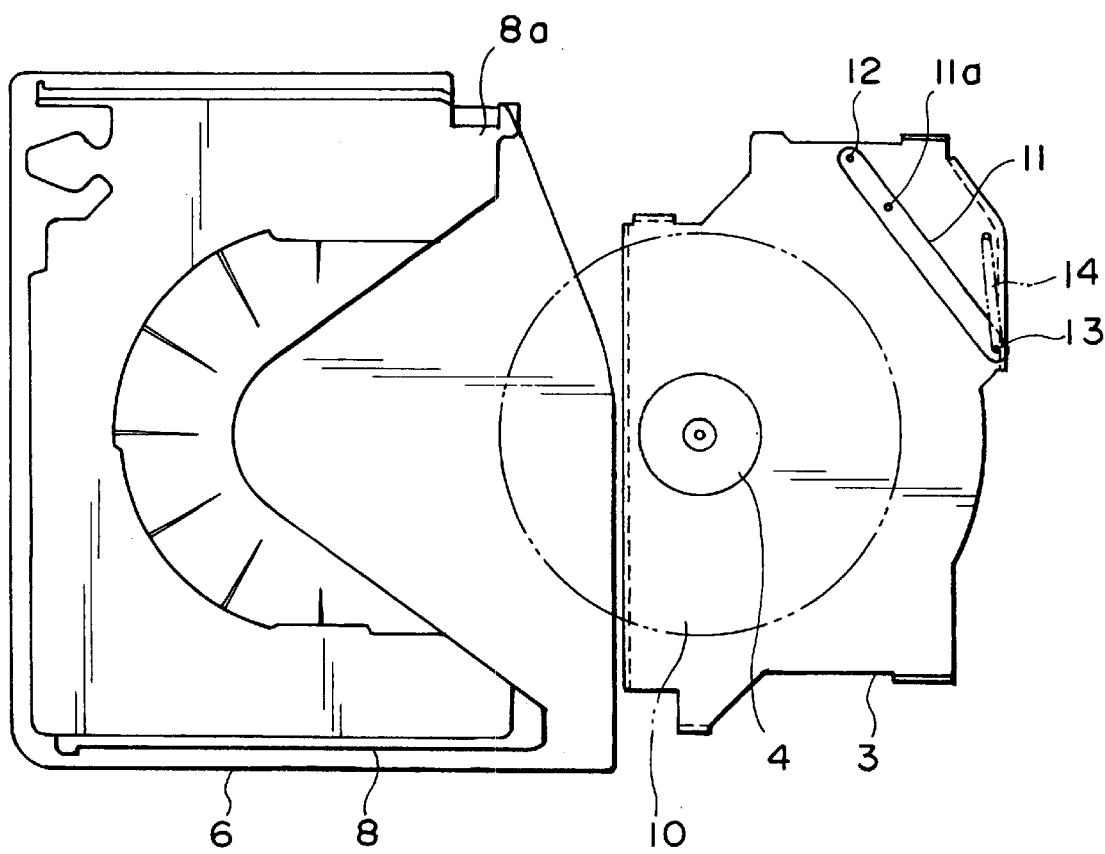
FIG. 6 is a plan view of the disk holder and playback unit of the disk playback apparatus shown in FIG. 1, especially showing a state of reproducing the disk of the 3.5-inch disk after the state shown in FIG. 5.

FIG. 2 to FIG. 6 are plan views which schematically show a plurality of operating conditions of the disk holder and playback unit of the disk playback apparatus shown in FIG. 1. Among these figures, FIG. 2 and FIG. 3 show a state of correcting a disk position and a state of reproducing the disk of the 5-inch disk after the state shown in FIG. 1, respectively. FIG. 4 to FIG. 6 show an initial state that a 3.5-inch disk is improperly accommodated, and subsequent states that the disk position is corrected and that the disk is reproduced, respectively.

[Configuration]

Referring to FIG. 1, a lift unit (holder movement control means) 2 is supported to be vertically movable with respect to a case 1 of the apparatus as shown in the right-hand part of the case 1 of the figure. This lift unit 2 comprises a playback unit (playback means) 3 for reproducing a disk, a turntable 4 thereof, a holder drawing member 5 for drawing a disk holder, and the like.

Among these components, the holder drawing member 5 is mounted on the chassis of the lift unit 2 to be movable in the disk transporting direction, i.e. a horizontal direction in the figure, and a fingernail-shaped projection 5a which engages with the engaging section of a disk holder is disposed at one end of the holder drawing member 5. The lift unit 2 is adapted to be moved upward or downward according to a disk selection instruction in order to adjust the height of the holder drawing member 5 to be flush with the disk holder holding therein the selected disk.

A magazine 6 is loaded in a magazine loading section which is disposed in the case 1 of the apparatus as shown in the left-part of the figure. In the magazine 2, disk holders 7 for a 5-inch disk as shown in FIG. 1 and disk holders 8 for a 3.5-inch disk as shown in FIG. 4 are combined as necessary and accommodated in a vertical stack arrangement. As shown in FIG. 1 and FIG. 4, each of disk holders 7, 8 accommodates a 5-inch disk and a 3.5 inch disk, respectively, each of which is inserted into the disk holder in the direction parallel to the main surface thereon. An engaging sections 7a, 8a for drawing out respective disk holders 7, 8 are disposed at one end of the respective disk holders 7, 8, respectively.

In addition to the basic configuration as mentioned above, a control link 11 for controlling a disk with respect to a normal chucking position is provided on the chassis of the playback unit 3 to be rotatable around an axis 11a. At one end of the control link 11, a holder butting pin (holder butting section) 12 for butting against the disk holder 7 or 8, and at the other end thereof, a disk control pin (disk control section) 13 for controlling a disk 9 or 10 with respect to the normal chucking position. Further, a release spring 14 which urges the control link 11 in the direction departing from the disk 9 or 10, i.e. counterclockwise direction in the figure, is disposed on the chassis of the playback unit 3.

More particularly, when the disk holder 7 or 8 is transported to a normal loading position as shown in FIG. 2 or FIG. 5, the disk holder 7 or 8 butts against the butting pin 12, thereby the control link 11 is pressed by the disk holder, and held at an individual disk control position corresponding to the diameter of the disk held in the disk holder. That is, when the control link 11 butts against the disk holder 7 for 5-inch disk holder as shown in FIG.2, the control link 11 is held at a first disk control position corresponding to the disk diameter of the 5-inch disk 9 by the disk holder 7, and when the control link 11 butts against the disk holder 8 for 3.5-inch disk holder as shown in FIG.5, the control link 11 is held at a second disk control position corresponding to the disk diameter of the 3.5-inch disk 9 by the disk holder 8.

In this case, the difference of the disk control positions of the control link 11 based on the buttings against the disk holders 7 and 8 is derived from the difference in shape of the butting section of the disk holder 7 and 8. As it is clear by comparing FIG. 1 and FIG. 4, the disk holders 7 and 8 respectively have engaging sections 7a and 8a at a similar position. At one end of the engaging sections 7a and 8a on the side of the holder drawing member, a same recess shaped like a concave is provided respectively. On the other hand, the other ends of the engaging sections 7a and 8a have recesses formed like a letter "<", however, respective recesses have different angles and are disposed at different positions to each other. Each of recesses which are disposed at different positions on the engaging sections 7a and 8a of the respective holders 7 and 8 forms a butting section against the holder butting pin 12 of the control link 11.

[Operation]

In accordance with the disk playback apparatus having the configuration as mentioned above, a disk can be controlled with respect to the normal chucking position by the control link 11 while loading the disk. Therefore, if the disk is not accommodated in the normal accommodation position within the disk holder, the disk position can be corrected by the control link 11 when the disk holder is drawn out to the loading position. A brief description will be given below to this point.

[Position Correction of 5-inch Disk]

Regarding the disk holder 7 for 5-inch disk which is accommodated in the magazine 6, when the 5-inch disk 9 held in this disk holder 7 is not located at the normal accommodation position as shown in FIG. 1, the position of the disk in the improperly accommodated state is corrected as follows. From the initial state shown in FIG. 1, the disk holder 7 is transported toward the playback unit 3 by moving the holder drawing member 5 rightward in the figure.

As a result, when the disk holder 7 reaches the loading position as shown in FIG. 2, the recess shaped like "<" in the engaging section 7a of this disk holder 7 and the holder butting pin 12 of the control link 11 butts against each other, and the control link 11 is pressed by the disk holder 7. Associated with the pressing by the disk holder 7, the control link 11 opposes the release spring 14 and rotates a little in the clockwise direction in the figure which is the disk control direction, and reaches the first disk control position. Then, in synchronization with the rotation of the control link 11, the disk control pin 13 presses the side of the 5-inch disk 9 to forcefully correct the position of the 5-inch disk 9, then holds this 5-inch disk in the normal chucking position on the turntable 4.

In this case, the control link 11 is mechanically locked to the first disk control position as shown in FIG. 2 by the disk holder 7 which is fixed on the loading position by the holder drawing member 5. Then, the position of the 5-inch disk 9 is forcefully corrected by the control link 11 which is mechanically locked as mentioned above, and the 5-inch disk 9 is mechanically chucked to the normal chucking position.

Thus good disk chucking is ensured by chucking the 5-inch disk 9 on the turntable 4 of the playback unit 3 at this normal chucking position after the position of the 5-inch disk 9 is corrected as mentioned above. After that, only the empty disk holder 7 is returned into the magazine 6 by moving the holder drawing member 5 leftward in the figure and the 5-inch disk 9 can be driven by driving the playback unit 3. In this case, the control link 11 is released from the disk holder 7, therefore the control link 11 is rotated by the urging force of the release spring 14 in the counterclockwise direction in the figure which is the direction of departing from the disk, and returned to the initial position.

[Position Correction of 3.5-inch Disk]

Regarding the disk holder 8 for 3.5-inch disk which is accommodated in the magazine 6, when the 3.5-inch disk 10 held in this disk holder 8 is not located at the normal accommodation position as shown in FIG. 4, the position of the disk in the improperly accommodated state is corrected as follows. From the initial state shown in FIG. 4, the disk holder 8 is transported toward the playback unit 3 by moving the holder drawing member 5 rightward in the figure.

As a result, when the disk holder 7 reaches the loading position as shown in FIG. 5, the recess shaped like "<" in the engaging section 8a of this disk holder 8 and the holder butting pin 12 of the control link 11 butts against each other, and the control link 11 is pressed by the disk holder 7. Associated with the pressing by the disk holder 8, the control link 11 opposes the release spring 14 and rotates a little in the clockwise direction in the figure which is the disk control direction, and reaches the first disk control position. The "<"-shaped recess of the engaging section 8a of the disk holder 8 is located at a shallower position than that of the disk holder 7 for the 5-inch disk, and the disk holder 8 more strongly presses the control link 11 than the disk holder 7, therefore, the control link 11 rotate beyond the first disk control position as shown in FIG. 2, and reaches the second disk control position as shown in FIG. 5. Then, in synchronization with the rotation of the control link 11, the disk control pin 13 presses the side of the 3.5-inch disk 10 to forcefully correct the position of the 3.5-inch disk 10, then holds this 3.5-inch disk in the normal chucking position on the turntable 4.

In this case, the control link 11 is mechanically locked to the first disk control position as shown in FIG. 5 by the disk holder 8 which is fixed on the loading position by the holder drawing member 5. Then, the position of the 3.5-inch disk 10 is forcefully corrected by the control link 11 which is mechanically locked as mentioned above, and the 3.5-inch disk 10 is mechanically chucked to the normal chucking position.

Thus good disk chucking is ensured by chucking the 3.5-inch disk 10 on the turntable 4 of the playback unit 3 at this normal chucking position after the position of the 3.5-inch disk 10 is corrected as mentioned above. After that, only the empty disk holder 8 is returned into the magazine 6 by moving the holder drawing member 5 in leftward in the figure and the 3.5-inch disk 10 by driving the playback unit 3. In this case, the control link 11 is released from the disk holder 8, therefore the control link 11 is rotated by the urging force of the release spring 14 in the counterclockwise direction in the figure which is the direction departing from the disk, and returned to the initial position.

[Effects]

As described above, in accordance with the present form, the position of the disk 9 or 10 in the state of improperly accommodated can be corrected using the transporting action of the disk holder 7 or 8 on account of the combination of the control link 11 and release spring 14 provided at a playback unit and the shape of the engaging sections 7a, 8a of the disk holders 7, 8. Therefore, the disk can be certainly transported to the normal chucking position irrespective of the disk accommodation state in the disk holder.

Especially, in accordance with the present form, the 5-inch disk 9 and the 3.5-inch disk 10 can be controlled respectively to the normal chucking position at each of the first and second disk chucking position by a single control link 11. Accordingly, two different-sized disks 9 and 10 can be certainly transported by a common control link 11 to the normal chucking position irrespective of the disk accommodation state in the disk holder. As the disks can be certainly transported to the normal chucking position, subsequent disk chucking operation can be performed well. Further, problems such as the failed disk playback or the disk recovery failure caused by the improper accommodation of the disk are not caused.

Thus, in accordance with the present form, there is provided a disk playback apparatus supported by a high degree of operational reliability wherein two different-sized disks 9 and 10 can be certainly transported to the normal chucking position by means of a simple structure using a common control link 11 and a common release spring 14 irrespective of the state of the disk accommodated in the holder.

[Other Preferred Embodiments in Accordance with the First Aspect of the Present Invention]

It is understood that the present invention is not limited to the abovementioned embodiments, and other various modifications may be made within the scope of the present invention.

While an apparatus adapted for two different-sized disks, i.e. the 5-inch disk and the 3.5-inch disk, are explained in the description related to the preferred form mentioned above, the present invention are also similarly applicable to various apparatuses adapted for other various sized disks.

Further, the present invention is also applicable to an apparatus adapted for three or more different-sized disks. That is, as well as the preferred form in the foregoing, the positions of the plural different-sized disks can be controlled using a common rotatable control member by changing the shape of the butting section of the disk holder depending on the disk size. In such case that three or more different-sized disks are treated, a high degree of effectiveness may be provided by holding a movable control member at each of the plural disk control position corresponding to the different-sized disks and controlling each of different-sized disks with respect to each disk control position as well as the preferred form in the foregoing.

Further, in accordance with the present invention, it is possible to correspond one of the plural disk control positions of the movable control members with the initial position of the movable control member. For example, the preferred form mentioned above is configured to control a large size disk at a first disk control position, that is, a position slightly rotationally transferred from the initial position, a first position, and to control a small size disk at a second disk control position, that is, a position further rotationally transferred from the first disk control position, however, it is possible to correspond the initial position of the movable control member with the first disk control position. In this case, the movable control member does not have to rotate for controlling a large size disk, it can certainly control the large size disk at the initial position, therefore, for the movable control member, rotation is necessary only when controlling a small size disk. Accordingly, the motion of the movable control member can be simplified. That is, if the large size disk protrudes from the disk holder, the position of the large size disk can be easily corrected without rotating the movable control member from its initial position.

On the contrary, it is also possible to configure to correspond the position for controlling the small size disk with the initial position, and rotate the movable control member only when controlling the large size disk. Further, as described above, when three or more different-sized disks are treated, motion of the movable control member can be simplified by corresponding a position for controlling one of the different-sized disks with the initial position and rotating the movable control member when controlling other different-diameter disks.

On the other hand, other configurations such as a configuration in which plural disk control sections corresponding to the different-sized disks are disposed on the side of the movable control member, a configuration in which individual movable control members corresponding to the different-sized disks provided are also possible.

Further, on the contrary, the present invention is also applicable to an apparatus adapted for one type of same sized disks. In this case, it is only necessary to control the movable control member to a single disk control position by the disk holder, therefore, the configuration can be simplified. Further, for the apparatus adapted for different-sized disks, it is also possible to configure to control the position of some specific disks only. For example, it is considered to control only the position of a small size disk which are easy to produce the accommodation failure condition.

In any case, the shape, number, and/or position of the movable control member, the holder butting section thereof, and the disk control section can be optionally selected. Further, in order to prevent the disk from damages caused by the movable control member, it is also considered to cover the surface of the disk control section of the movable control member by an elastic material or the like. Still further, in the present invention, concrete configurations of the disk holder, the playback means, the holder movement control means, and the like are optionally selected.

On the other hand, in the above description relating to the preferred form, the apparatus of the type of loading a magazine which is adapted to accommodate a plurality of disk holders is described, however, the present invention may be similarly applicable to the apparatus of the type of operating a single disk holder, and in this case, a high degree of effectiveness may be provided as in the abovementioned preferred form.

Further, the present invention is applicable to various disk playback apparatuses adapted for the CD, LD, MD, and some combination thereof, and in any case, a high degree of effectiveness as mentioned above relating to the preferred form may be provided.

As described above, in accordance with the first aspect of the present invention, there is provided a disk playback apparatus supported by a high degree of operational reliability wherein a disk can be certainly transported to the normal chucking position on the playback means irrespective of the state of the disk accommodated in the holder by providing a movable control member on the playback means for controlling the disk with respect to the chucking position using the butting against the disk holder.

[Disk Changer Device in Accordance with the Second Aspect of the Present Invention]

A description will be given to preferred forms of the disk changer device in accordance with the second aspect of the present invention.

First Form

[Configuration]

Figure 7A:
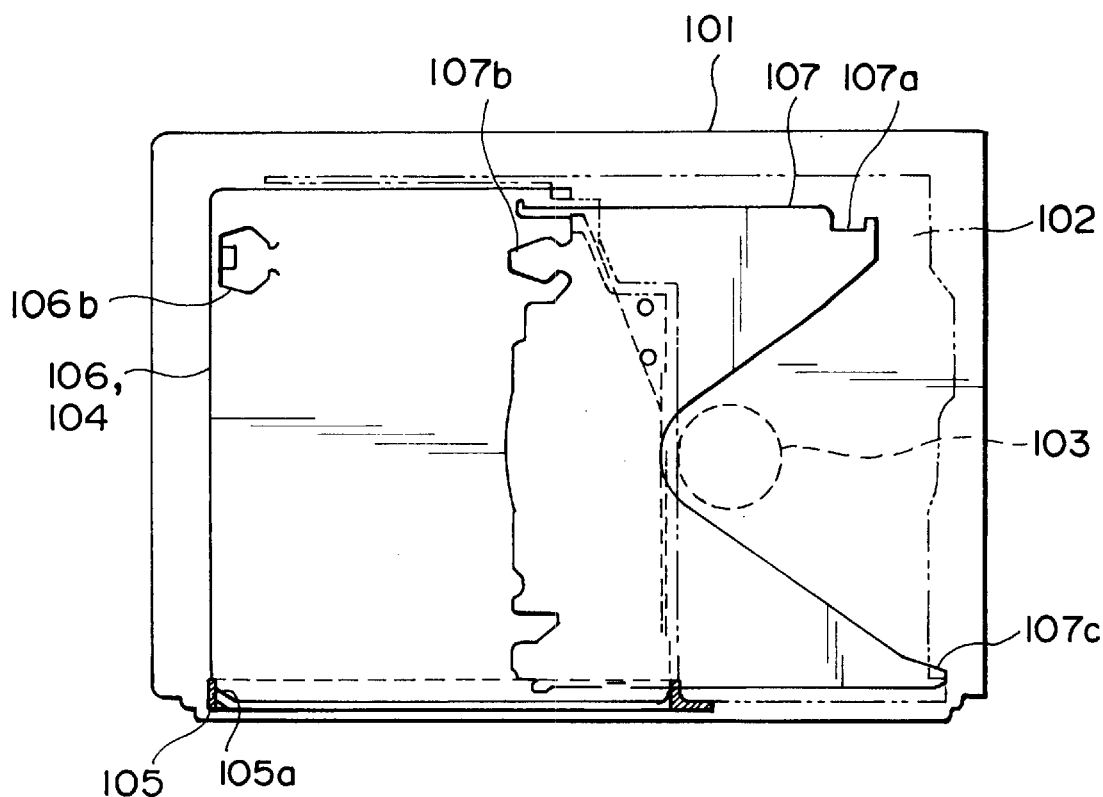
FIG. 7A is a plan view of a disk changer device which is one form of the present invention.
Figure 7B:
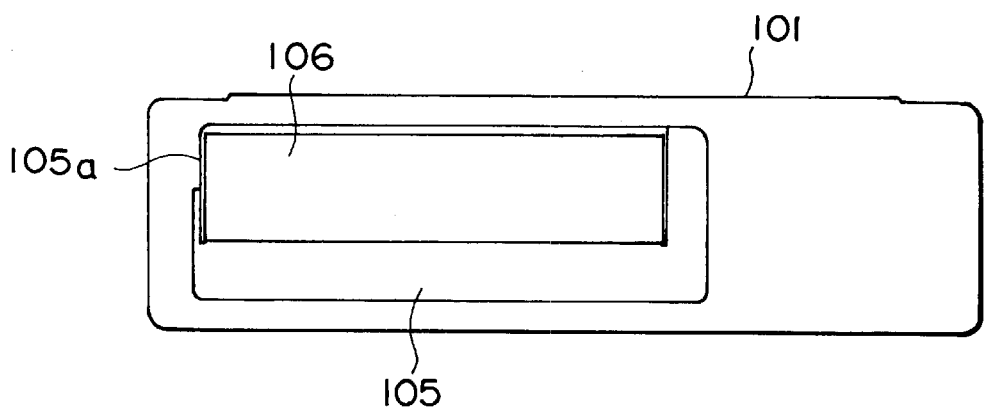
FIG. 7B is a side view of the disk changer device shown in FIG. 7A.

FIGS. 7A and 7B are views showing a first form of the disk changer device in accordance with the present invention: FIG. 7A is a plane view, and FIG. 7B is a side view. Referring to FIG. 7A, a lift unit 102 containing drawing means for drawing out a disk holder and playback means for reproducing a disk is supported to be vertically movable with respect to a case 101 in the right-hand part in the case 101 of the figure. In the figure, 103 designates a turntable of the playback means on which a disk is mounted. Further, in the left-hand part in the case 101 of the figure, there is disposed a magazine accommodation section 104 into which a magazine 106 is inserted through a magazine insertion opening 105a provided at one side of the case 101, and accommodated as shown in FIG. 7A. An edge of the magazine insertion opening 105a is constructed by a insertion guide member 105 which is mounted on the side of the case 101, and the dimensions of the magazine insertion opening is generally same as the outer dimensions of the magazine 106.

Figure 8:
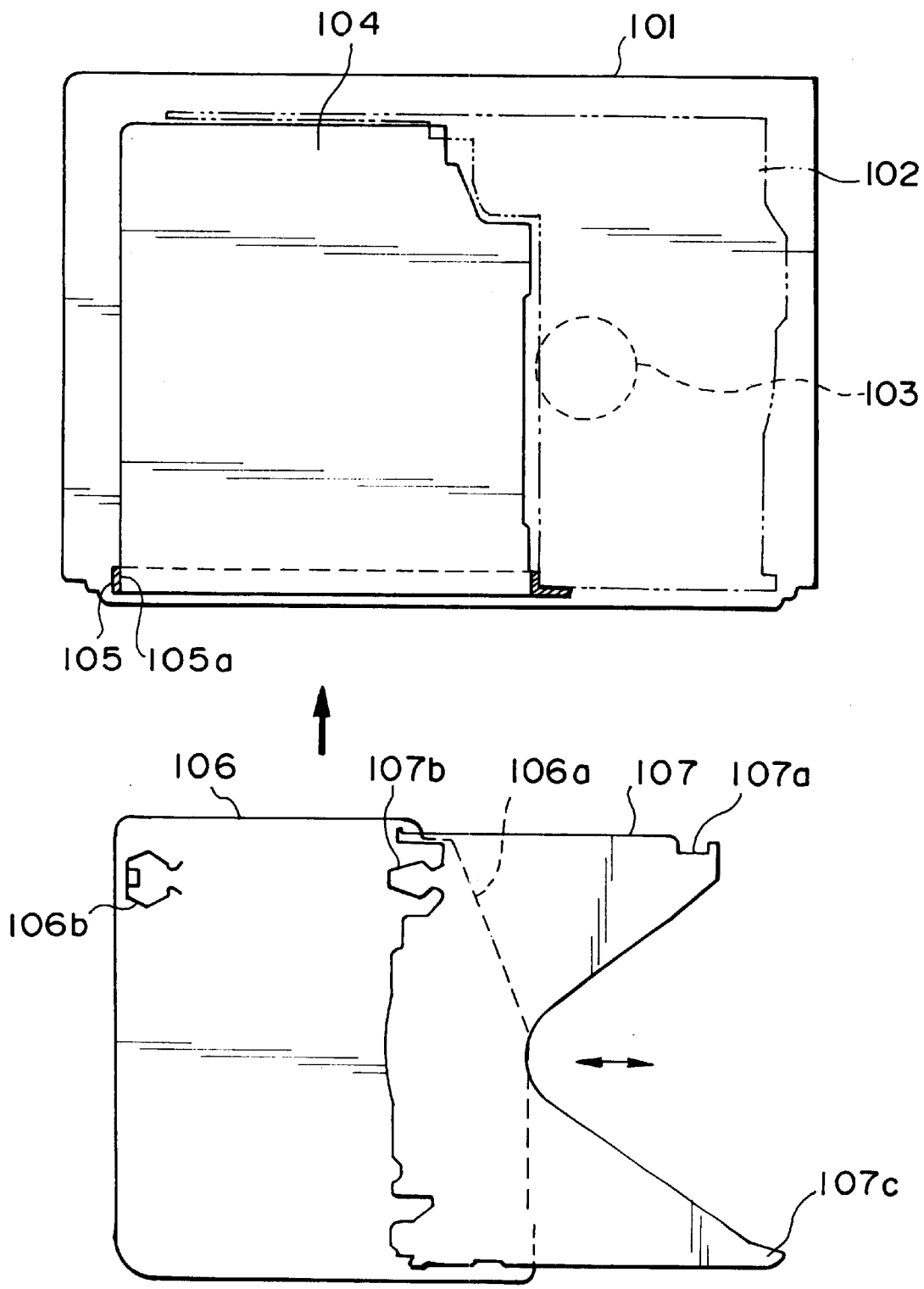
FIG. 8 is a plan view showing a state before a magazine is inserted into the disk changer device shown in FIG. 7A.
Figure 15:
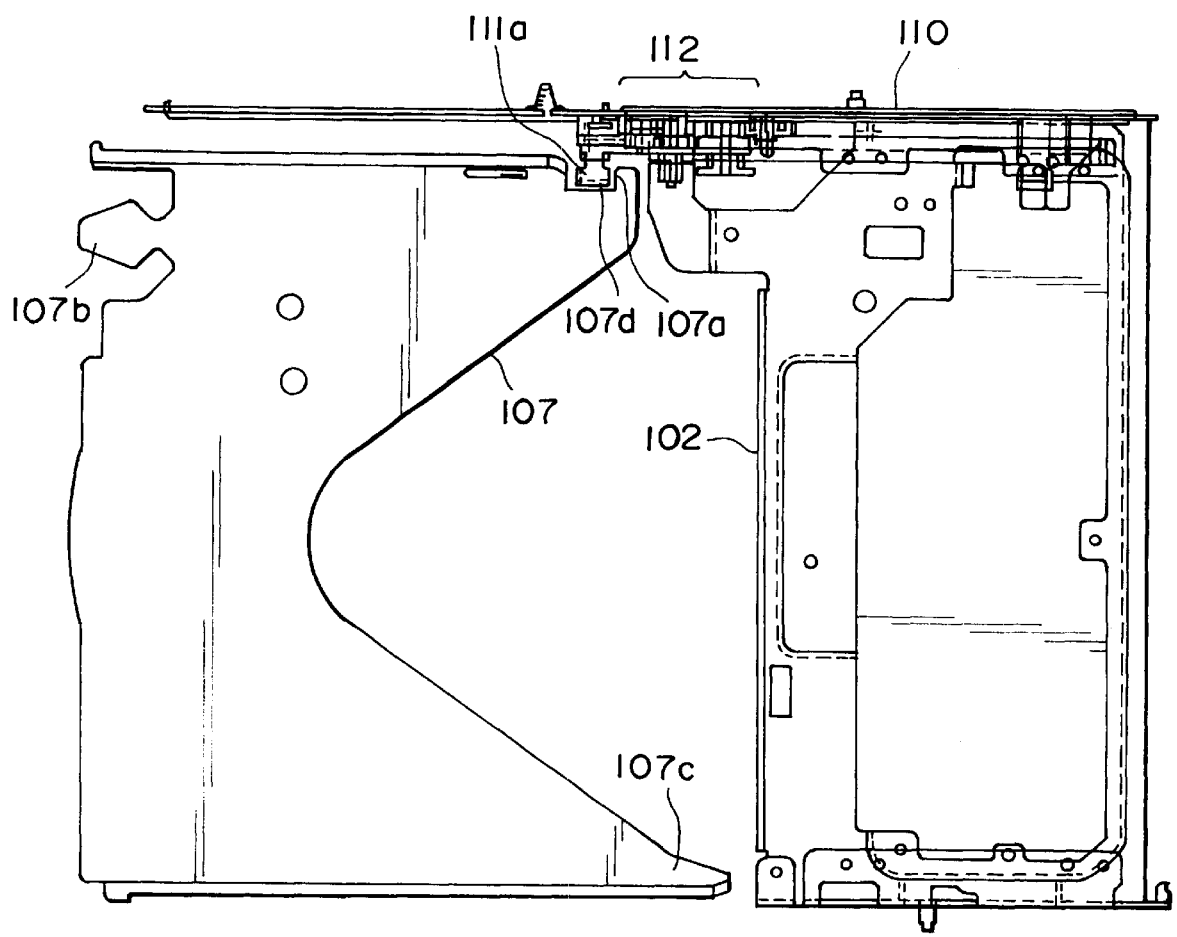
FIG. 15 is a plan view of a holder transport mechanism section except the playback means among a lift unit 2 shown in FIG. 7A.

FIG. 8 is a plan view of the disk changer in the FIG. 7A showing the state before the magazine 106 is inserted therein. As shown FIG. 8, the magazine 106 accommodates a disk holder 107 therein. While only one disk holder 107 is shown in the holder, there are accommodated plural disk holders 107 in the vertical direction. These disk holders 107 are configured to be drawable rightward in the figure through an aperture 106 which is disposed at the right hand part of the figure in the magazine 106, and engaged with a projection 111a of a holder drawing member (drawing means) 111 as shown in FIG. 15 via a engaging section 107a which is disposed at the right end of one side of the magazine 106, then drawn out. In this preferred form, the engaging section 107a of the disk holder 107 is composed of a pair of engagement faces which are horizontally opposed in the figure and a groove which is disposed therebetween, and the engagement face on the side corresponding to the moving direction of the holder drawing member 111 is adapted to be engaged with the projection 111a of the holder drawing member 111. Further, the respective disk holders 107 are fixed at a predetermined accommodation position in the magazine 106 by engaging a fixing projection 107b disposed at the left end opposed to the engaging section 107a with a spring 106b which is disposed at the inner back of the magazine 106

More particularly, the spring 106b of the magazine 106 has a pair of opposed arms which are adapted to clamp the fixing projection 107b therebetween. In thin case, each of the pair of the arms of the spring 106b has its widest portion in the middle. The arm becomes narrower at a steep angle from the widest portion to the terminal end thereof, and has its narrowest portion at the terminal end thereof, while the arm becomes narrower at a relatively gentle angle from the widest potion to the starting end. Similarly, the fixing projection 107b of the disk holder 107 which is clamped by the spring 106b has its widest portion in the middle. The projection becomes narrower at a steep angle from its widest portion to its starting end which is corresponding to the terminal end of each of the pair of the springs 106, and becomes narrower at a relatively gentle angle from the widest portion to the terminal end thereof.

Figure 11:
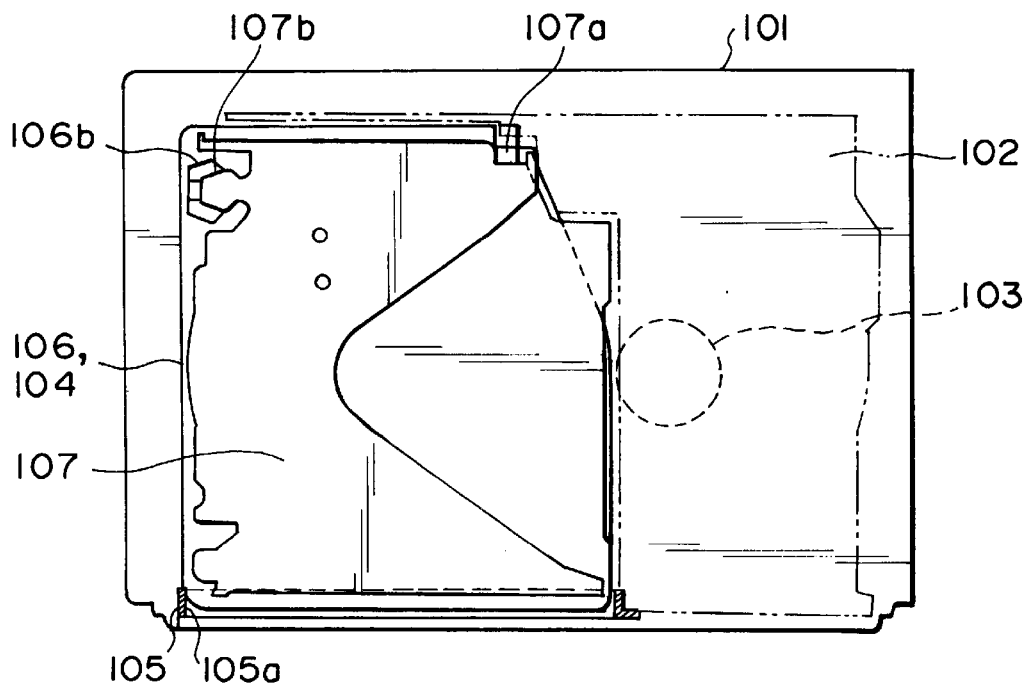
FIG. 11 is a plan view showing a state that the magazine is accommodated in a magazine accommodation section after the state shown in FIG. 10, and the disk holder is accommodated in a predetermined accommodation position in the magazine.

Due to the shapes of the spring 106b and the fixing projection 107b as mentioned above, when the widest portion of the fixing projection 107b of the disk holder 107 reaches the position past the narrowest portion of the terminal end of the spring 106b, the fixing projection 107b is fully inserted in the spring 106b as far as it will go in the manner in which the fixing projection 107b is pressed by the spring 106b, thereby the disk holder 107 is attracted to the predetermined accommodation position in the magazine 106 as shown in FIG. 11.

On the other hand, at the right hand part of the side opposed to the engaging section 107a of the disk holder 107, position control section 107c which is further projected from the engaging section 107a is disposed. The narrow end face at a terminal end of the position control section 107c is generally overlaps the inner circumference surface of the edge of the magazine insertion opening 105a. That is, the edge of the magazine insertion opening 105a is adapted to control the position of the end face of the magazine 106 which is accommodated in the magazine 106 when the magazine 106 is inserted in the magazine insertion opening 105a. The 107c has a sloped surface which slantingly extends from the end face of the terminal end in the magazine insertion direction. If the disk holder 107 is inserted in the magazine 106 with the disk holder 107 projected, the edge of the magazine insertion opening 105a controls the position of the then the sloped surface of the position control is engaged with the edge of the magazine insertion opening 105a to control the position thereof before the position of the end face is controlled by the edge of the magazine insertion opening 105a.

Figure 12:
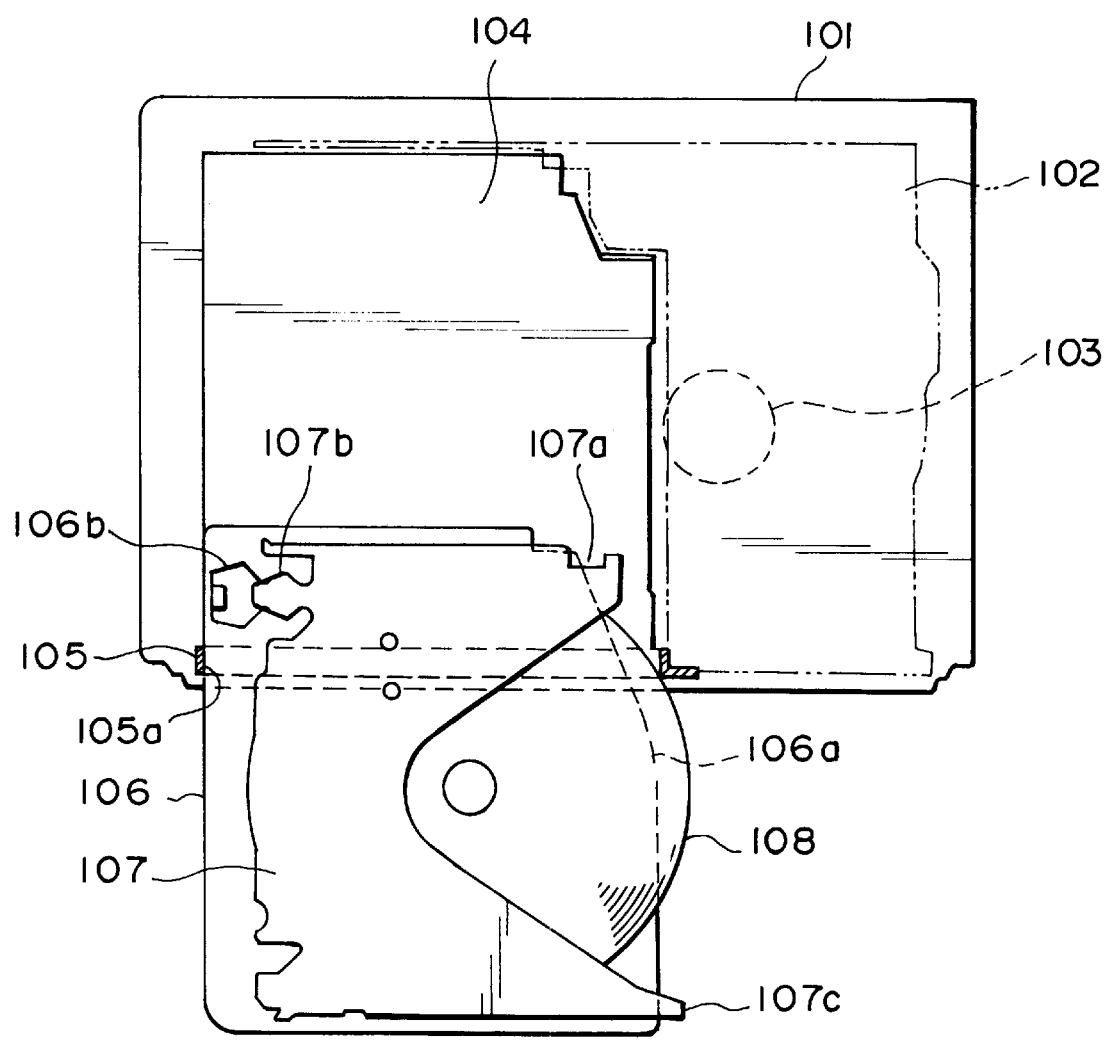
FIG. 12 is a plan view of the disk changer device shown in FIG. 7A, especially showing a state that the magazine is inserted in the disk changer device with a disk holder holding a disk protruding beyond a predetermined accommodation position.
Figure 13:
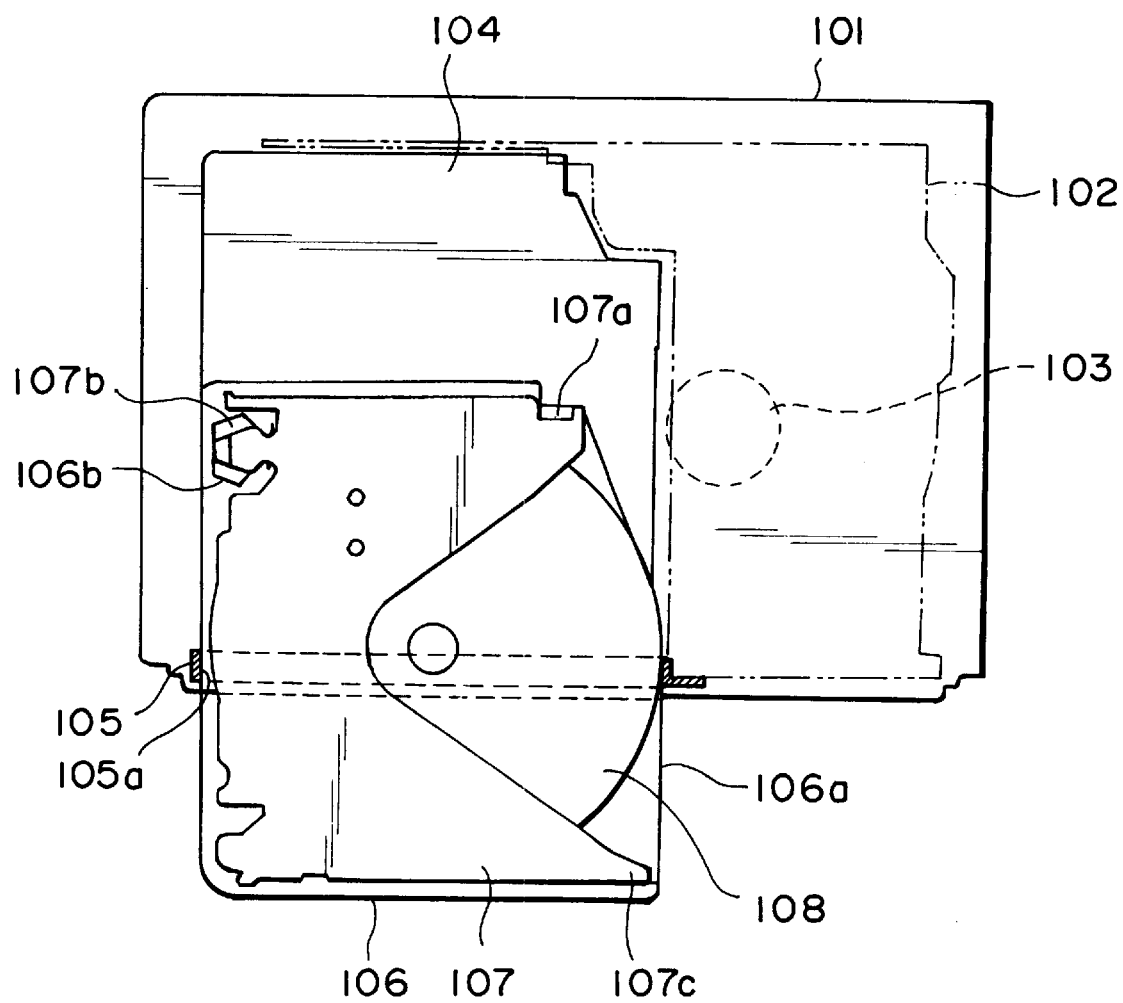
FIG. 13 is a plan view showing a state that the magazine is further inserted from the state shown in FIG. 12 and the disk holder is pressed toward the inside of the magazine by the magazine inserting opening.
Figure 14:
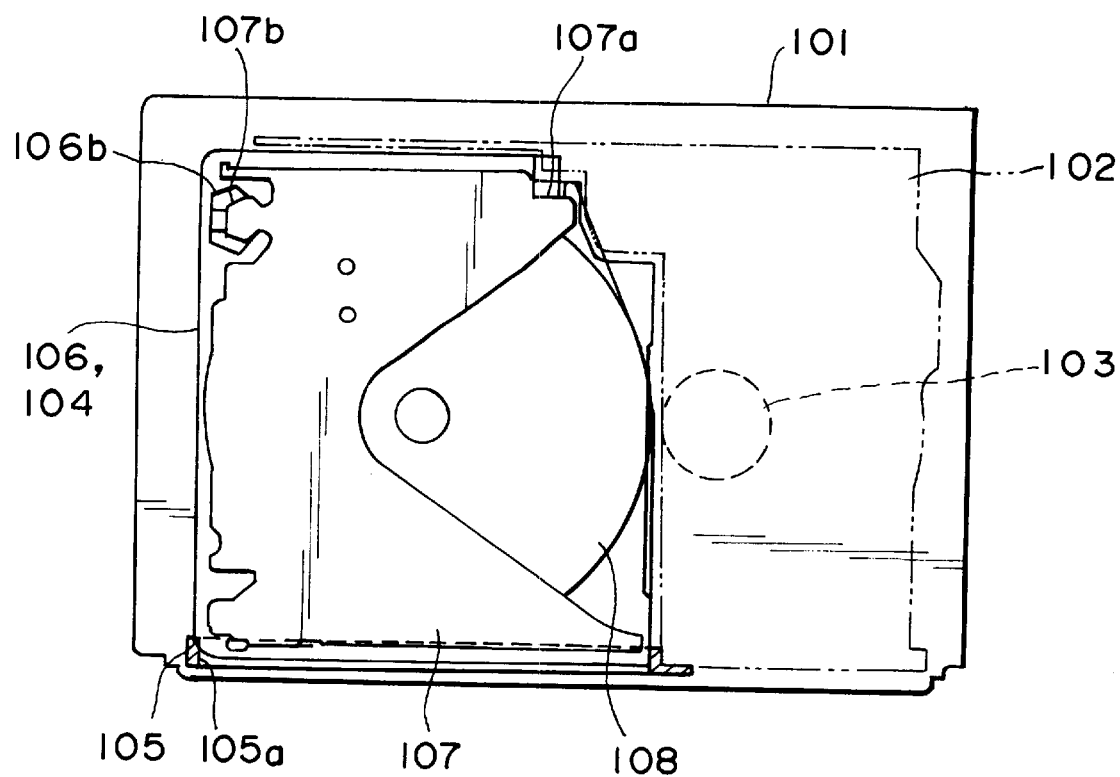
FIG. 14 is a plan view showing a state that the magazine is accommodated in a magazine accommodation section after the state shown in FIG. 13, and the disk holder is accommodated in a predetermined accommodation position in the magazine.

FIG. 12 to FIG. 14 show the state that the disk 108 is held in the disk holder 107. As shown in FIG. 14, the aperture 106a of the magazine 106 is configured to be generally flush with the end face of the disk 108 accommodated in the disk holder 107 which is located at the predetermined accommodation section in the magazine 106, and the position of the end face of the disk 108 held in the disk holder 107 as well as the position of the position control section 107c of the disk holder 107 in this aperture 106 are controlled by the edge of the 105a when the magazine 106 is inserted through the magazine insertion opening 105a.

FIG. 15 is a plan view showing a holder transport mechanism 110 except the playback means in the lift unit 102. As shown in FIG. 15, the holder transport mechanism 110, which provided on the side wall 102a of the lift unit 102 on the side opposed to the magazine insertion opening 105a, comprises a disk holder drawing member 111 for drawing out the disk holder 107, a gear mechanism 112 for moving the disk holder drawing member leftward or rightward in the figure, and the like. 111a designates a fingernail like projection which is provided at one end of the holder drawing member 111 and projects horizontally therefrom. In this case, the holder drawing member 111 and disk holder 107 are located at their initial positions as shown in FIG. 1A, and the projection 111a of the holder drawing member 111a is configured to overlap the groove 107d of the engaging section 107a of the disk holder 107 when the disk holder 107 is properly accommodated in the predetermined accommodation section in the magazine 106 which is loaded in the disk changer.

[operation]

Figure 9:
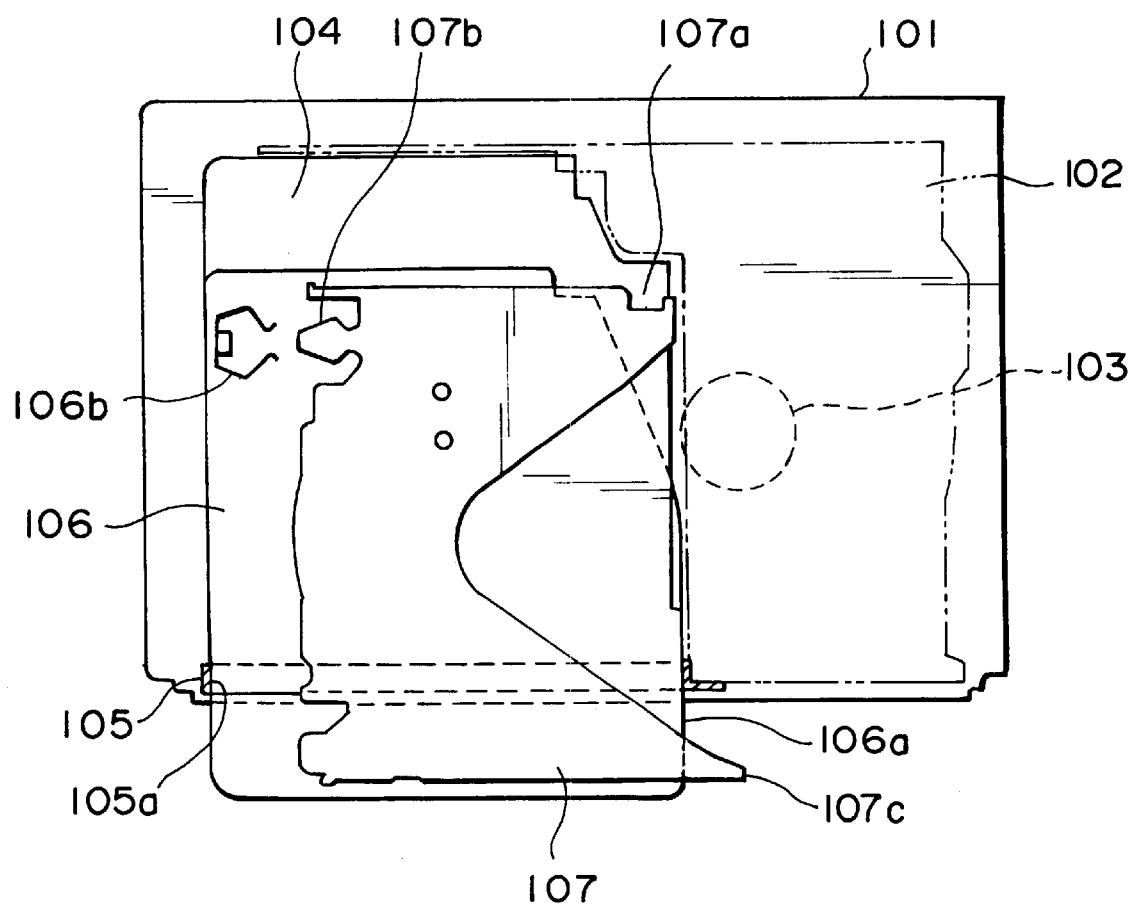
FIG. 9 is a plan view of the disk changer device shown in FIG. 7A, especially showing a state that the magazine is inserted in the disk changer device with a disk holder protruding beyond a predetermined accommodation position.

The preferred form having the configuration as mentioned above operates as follows. As shown in FIG. 9, when the magazine 106 is inserted through the magazine insertion opening 105a in the state that the fixing projection 107b of the disk holder 107 accommodated in the magazine 106 is located some distance from the spring 106b, and that the disk holder 107 is relatively largely protruded outward beyond the predetermined accommodation position, the magazine 106 is inserted as it is to some mid point as long as the engaging section 107a of the disk holder 107 is inserted.

As mentioned above, in such case, according to the prior art, the magazine 106 is accommodated into the magazine accommodation section 104 with the fixing projection 107 being remained in the improperly accommodated state if the disk holder 107 protrudes outward beyond the predetermined accommodation position.

Figure 10:
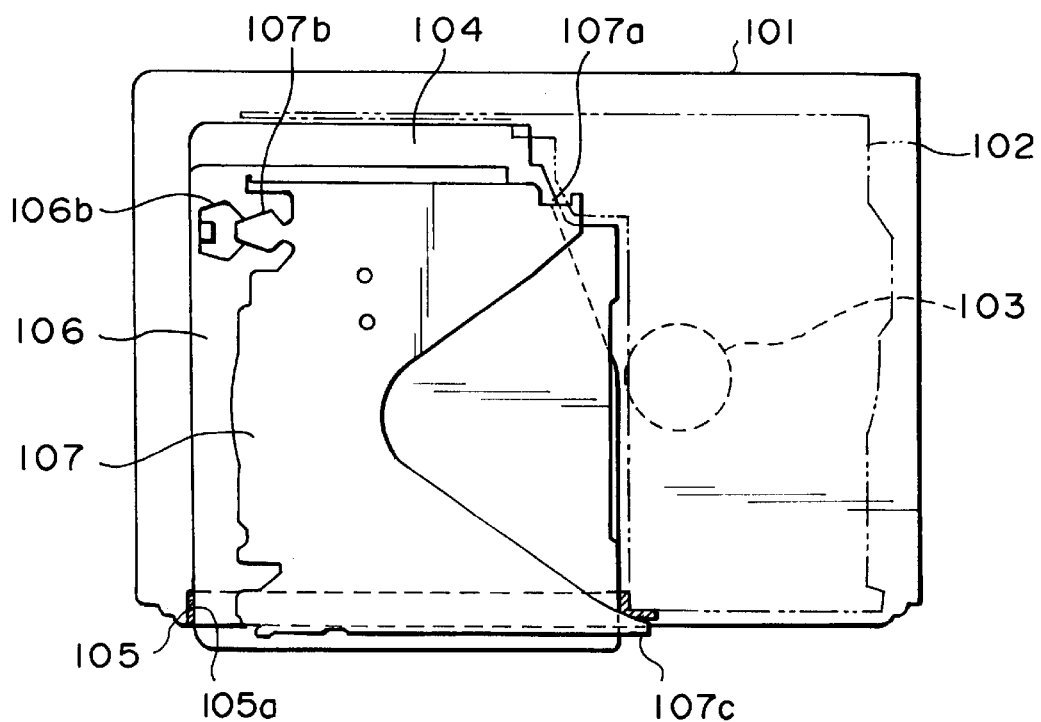
FIG. 10 is a plan view showing a state that the magazine is further inserted from the state shown in FIG. 9 and the disk holder is pressed toward the inside of the magazine by a magazine inserting opening.

On the contrary, in accordance with the present form, the improperly accommodated state of the position control section 107 can be corrected as follows. As shown in FIG. 10, the sloped surface of the position control section 107c is engaged with the edge of magazine insertion opening 105a when the p107c of the disk holder 107 reaches the magazine insertion opening 105a. According to subsequent insertion of the magazine 106, the sloped surface of the position control section 107c of the disk holder 107 is pressed by the edge of the magazine insertion opening 105a in the direction toward the inside of the magazine 106, that is, leftward in the figure, and therefore the disk holder 107 is mechanically pressed toward the predetermined accommodation position. At this time, the disk holder 107 is pressed smoothly and fully toward the predetermined accommodation position depending on the angle of the sloped surface of the position control section 107c of the disk holder 107. Then, as shown in FIG. 11, the disk holder 107 is properly accommodated in the predetermined accommodation position at the time when the position control section 107c of the disk holder 107 reaches the magazine insertion opening 105a.

Especially, in accordance with the present form, due to the characteristic shapes of the spring 106b in the magazine and the 107b of the disk holder 107, the widest portion of the fixing projection 107b of the disk holder 107 moves past the narrowest portion at the terminal end of the spring 106b when the disk holder 107 is inserted into the magazine to some extent, therefore, the position control section 107 can be certainly moved to the predetermined accommodation position therefrom to the predetermined accommodation position attributed to a synergistic effect of the pressing force of the edge of the magazine insertion opening 105a and the urging force the spring 106b.

Further, when using an actual disk changer, the magazine 106 is inserted with the disk holder 107 holding therein a disk 108 as shown in FIG. 12 to FIG. 14. In this case, when the magazine 106 is inserted through the magazine insertion opening 105a in the state that disk holder 107 holding therein a disk 108 is relatively largely protruded outward beyond the predetermined accommodation position as shown in FIG. 12, the position of the disk 108 is controlled by the edge of the magazine insertion opening 105a as shown in FIG.13, thereby the disk holder 107 holding this disk 108 is pressed inward and accommodated in the predetermined accommodation position. That is, in accordance with the present form, the aperture 106 a of the magazine 106 is configured to be generally flush with the end face of the disk 108 held in the disk holder 107 located in the predetermined accommodation position in the magazine 106 as described above, therefore the improperly accommodated state of the disk holder 107 is also subsidiary corrected by the disk 108 as in the foregoing.

As described above, in accordance with the present form, the position control section 107 can be certainly properly accommodated in the predetermined accommodation position when inserting the magazine 106 into the disk changer even if a disk holder 107 in a magazine 106 is not located at a predetermined accommodation position. Accordingly, good transportation operation of the disk holder 107 is ensured and the disk holder can be certainly transported to the predetermined position near the playback means Second Form

[Configuration]

Figure 16:
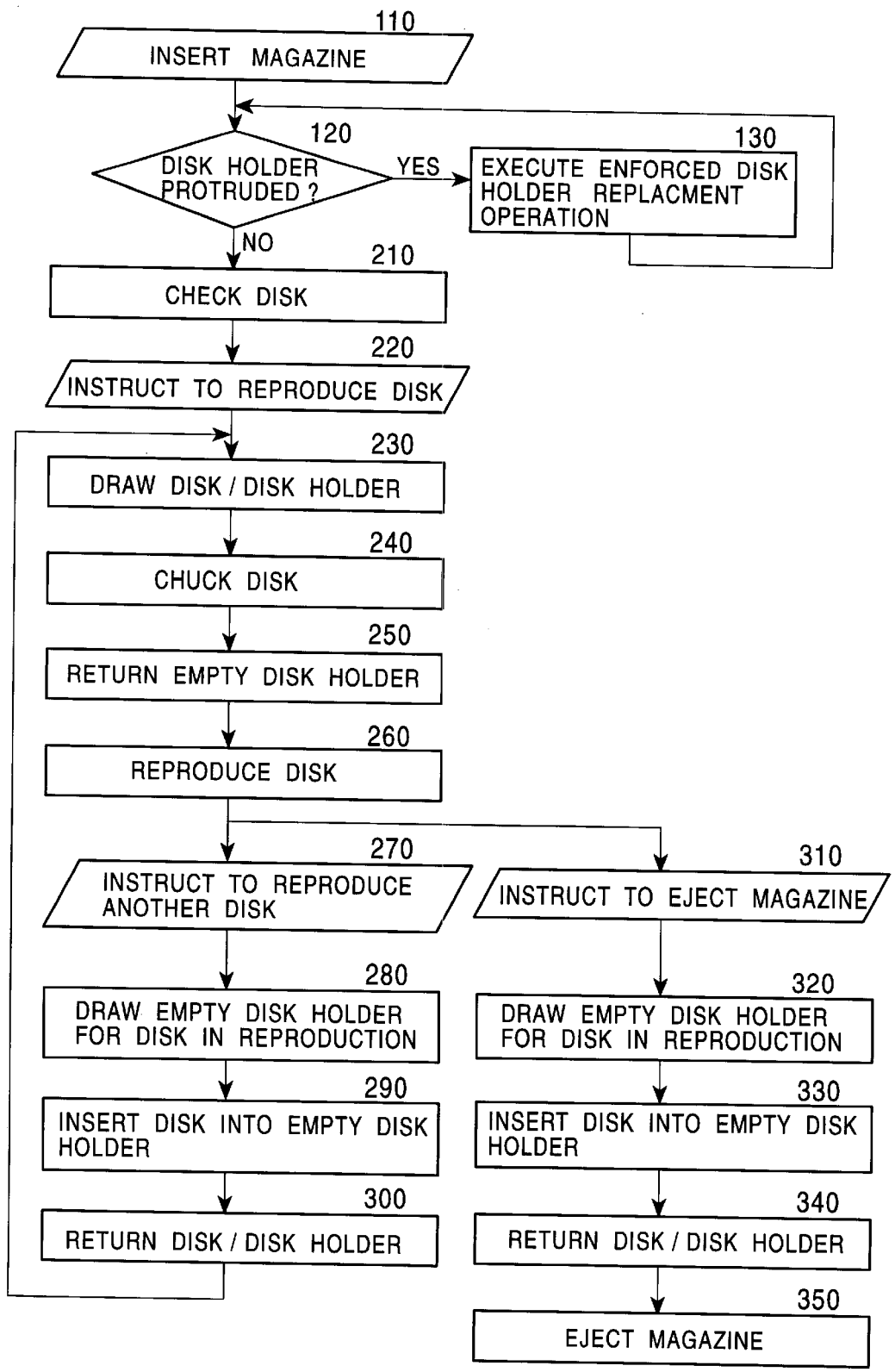
FIG. 16 is a flowchart used for explaining operation procedures of the second form of the disk changer device in accordance with the present invention.

FIG. 16 is a flowchart used for explaining the operational procedure of the second form of the disk changer in accordance with the second aspect of the present invention. That is, the present form is configured to allow the determination of the protrusion of the disk holder 107 using the mechanism of the abovementioned first form by changing a part of the control program of a control unit which is generally provided for controlling a disk changer.

Figure 28:
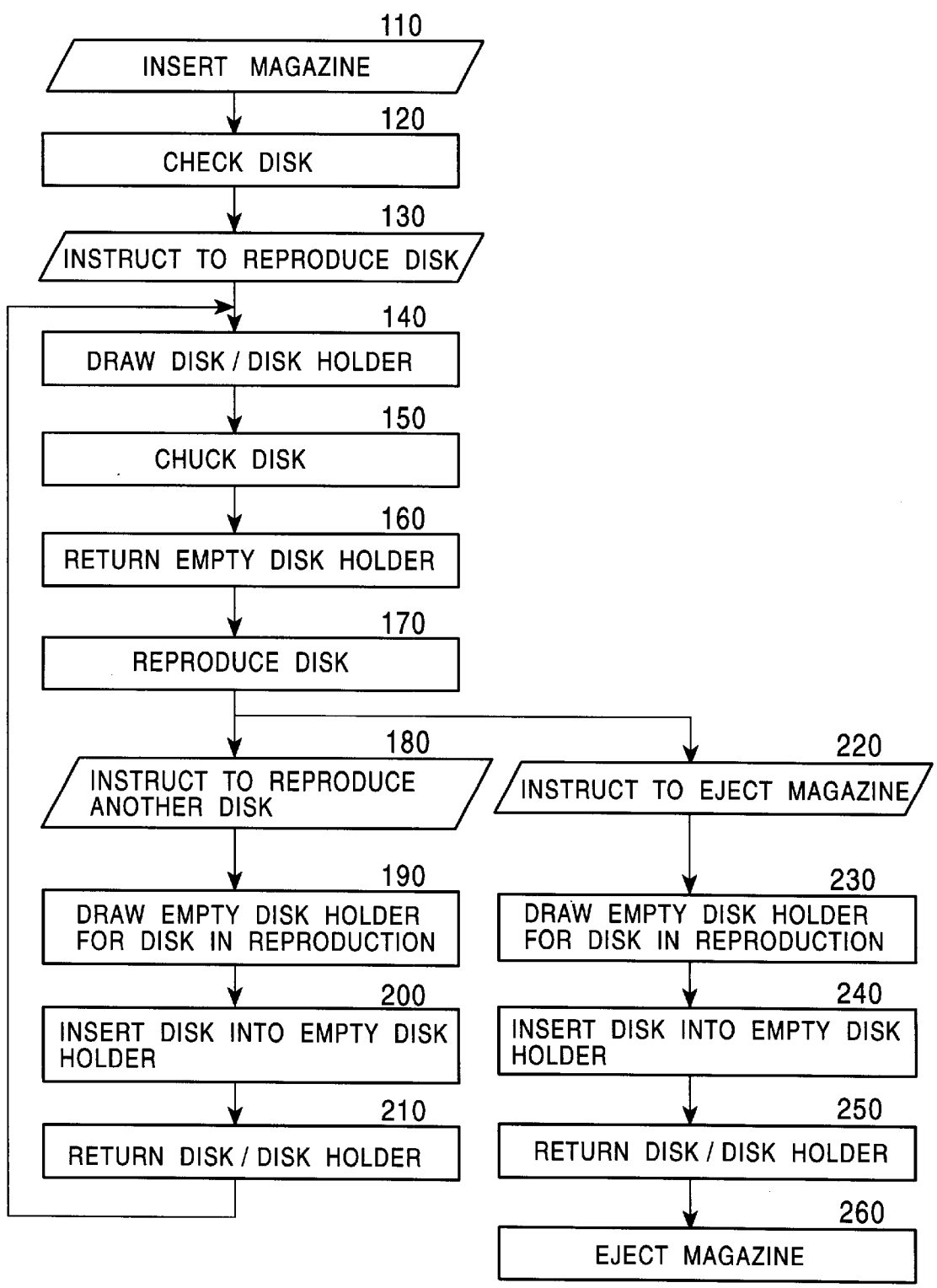
FIG. 28 is a flowchart used for explaining operation procedures of a disk playback unit based on a system to which the present invention is applied.

As shown in FIG. 16, the basic operational flow of the disk changer in accordance with the present form is similar to that of the conventional disk changer as shown in FIG. 28. That is, operations after checking disk (Step 210) are precisely identical to those shown in FIG. 28 except that whether the disk holder is protruded is checked (Step 120) and if the disk holder protrudes, the disk holder compulsive accommodation operation is performed (Step 130) in the present form. On the other hand, if the disk holder does not protrude, that is, the disk holder is accommodated in a predetermined accommodation position in the magazine, control proceeds to Step 210 as it is and the disk check is performed.

Figure 17:
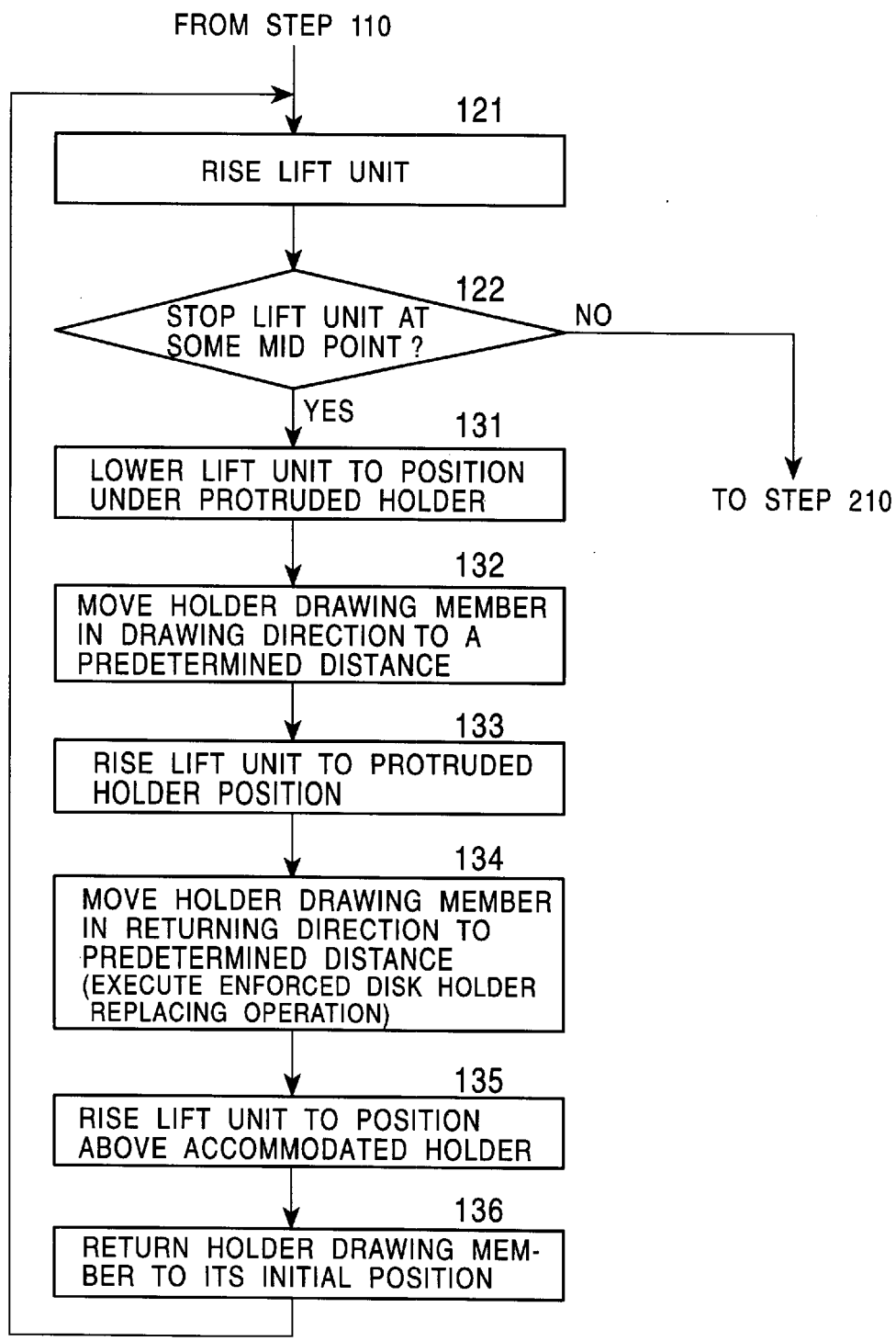
FIG. 17 is a flowchart used for explaining a concrete example of disk holder protrusion check operation and subsequent compulsive accommodation operation among the flowchart of FIG. 16.
Figure 18A:
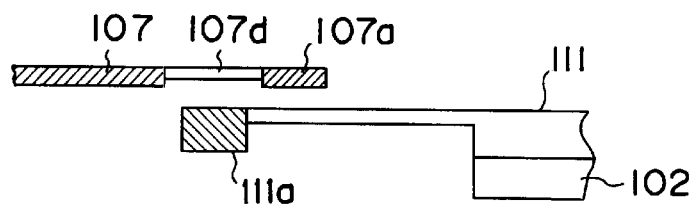
FIG. 18A to FIG. 18G show schematic diagrams showing a concrete procedure of the compulsive accommodation operation shown in FIG. 17.

FIG. 17 is a flowchart showing a specific example of the protrusion check of the disk holder and the subsequent compulsive accommodation operation, while FIGS. 18A to 18G are schematic views showing the specific procedures of the compulsive accommodation operations by means of the disk drawing member 111. Principles of the protrusion checking operation and the subsequent compulsive accommodation operation will be described below according to the flowchart shown in FIG. 17. As shown in FIG. 18A, at the initial state before the magazine is inserted, the lift unit 102 containing the holder drawing member 111 is placed at a position lower than the lowermost disk holder 107 in the magazine 106 on standby. At this time, the holder drawing member 111 is located at the initial position which is which is horizontal to the lift unit 102. In this initial position, the projection 111a of the holder drawing member 111 is positioned to overlap the groove 107d of the engaging section 107a of the disk holder 107 in the predetermined accommodation section in the magazine 106.

Then, when the magazine 106 is inserted after the abovementioned standby state (Step 110), whether each of plural disk holders 107 accommodated in the magazine 106 is protruded is checked as follows.

First, as shown in FIG. 17, the lift unit 102 containing the holder drawing member 111 is moved upward from the lowermost disk holder 107 to the uppermost disk holder 107 (Step 121), whether the lift unit 102 stops at some mid point is checked, and thereby whether any disk holder 107 protrudes is checked (Step 122).

Figure 18B:
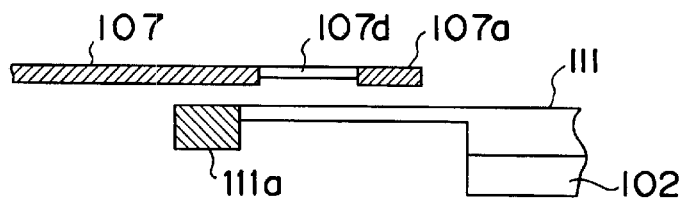
Figure 18C:
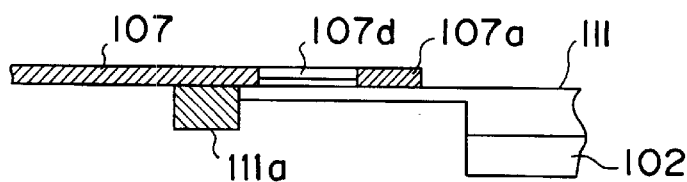

That is, if the disk holder 107 is accommodated in the predetermined accommodation section in the magazine 106, the projection 111a of the holder drawing member 111 overlaps the groove 107d formed between a pair of the engaging surfaces of the disk holder 107 and the engaging section 107a as shown in FIG. 18A, and therefore the holder drawing member 111 can move upward without any obstacle On the contrary, when the disk holder 107 protrude outward beyond the predetermined accommodation position as shown in FIG. 18B, the overlapping length of the holder drawing member 111 and fixing projection 107 becomes longer and the projection 111a of the holder drawing member 111 overlaps the position near the center from the engaging section 107a of the disk holder 107. Accordingly, when the lift unit 102 containing the holder drawing member 111 is moved upward from the state mentioned above, the projection 111a of the holder drawing member 111 disadvantageously butts against the protruded position near the center from the engaging section 107a of the disk holder 107, and therefore the upward movement of the lift unit 104 is interfered. Accordingly, when the upward movement of the lift unit 102 in interfered, it can be determined that the disk holder 107 at that position protrudes and therefore the protruded disk holder 107 and the holder drawing member 111 is disadvantageously butts to each other.

Figure 18D:
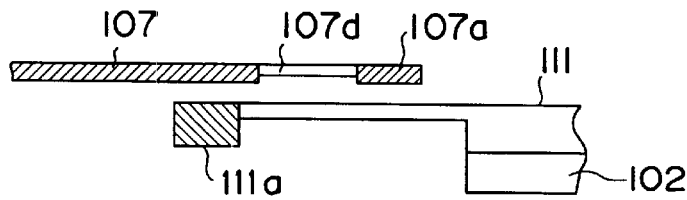
Figure 18E:
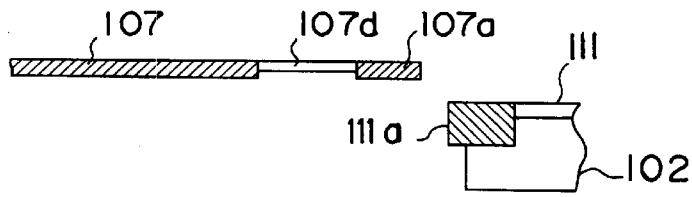
Figure 18F:
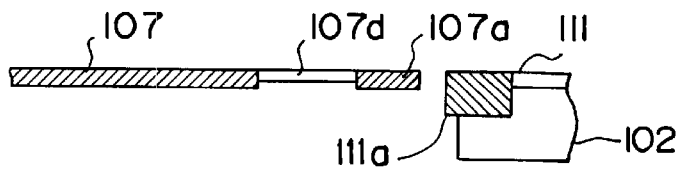
Figure 18G:
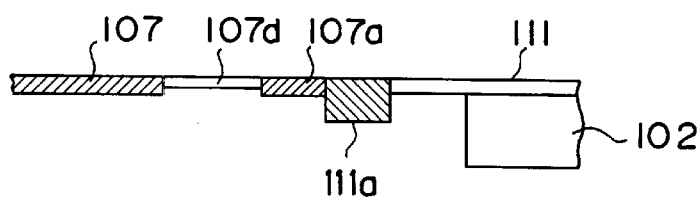

If the upward movement of the lift unit 102 is interfered in Step 122, the lift unit 102 is slightly lowered as shown in FIG. 18D (Step 131), then the holder drawing member 111 is moved in the drawing direction for predetermined distance in the drawing distance to move the projection 111a to the position where the projection 111a does not overlaps the tip of the disk holder 107 (Step 132). After that, as shown in FIG. 18F, the lift unit 102 is moved upward for a predetermined distance and the height of the projection 111a of the holder drawing member 111 is adjusted to be flush with the disk holder 107 (Step 133), then, the disk holder 107 is forcefully pressed in the predetermined accommodation position as shown in FIG. 18G by moving the holder drawing member 111 to the initial position in the drawing direction and pressing the horizontal end face of the terminal end of the fixing projection 107 by means of the horizontal end face of the projection 111a of the holder drawing member 111 (Step 134).

After completion of the compulsive accommodation movement as mentioned above, the lift unit 102 is moved upward for a predetermined distance, the height of the projection 111a of the holder drawing member 111 is adjusted to be flush with the height between the pressed disk holder 107 and the just above disk holder 107 thereof (Step 135), and the holder drawing member 111 is returned to the initial position (Step 136), then control returns to step 111 to move the lift unit 102 upward. Subsequently, if the upward moving is interfered again in Step 122, Step 131–Step 136 in the foregoing are repeated. If it is determined in Step 122 that the lift unit 102 does not stop at midpoint and finally reaches the uppermost disk holder 107, then the protrusion check of the disk holder 107 is finished and control transfers to the disk check step (Step 210) as shown in FIG. 16.

Figure 19:
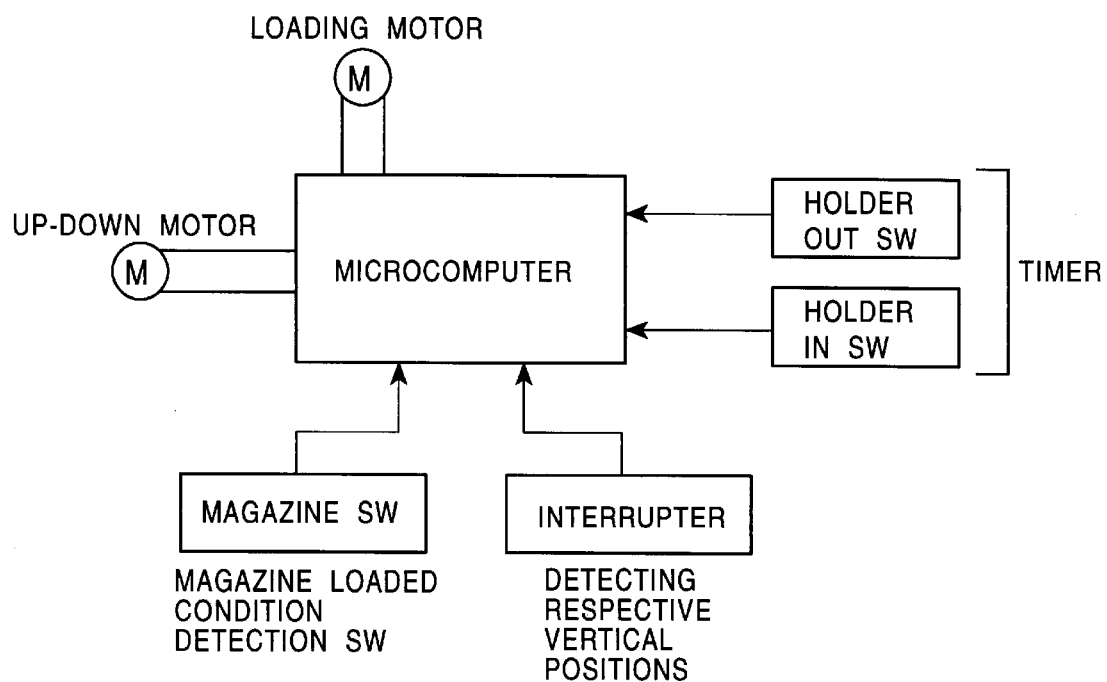
FIG. 19 is a view showing a circuit for checking the protrusion used in the operation procedures shown in FIG. 16 by way of example.

In the present form, the vertical position of the lift unit 102 can easily verified by using an existing circuit of the disk changer, for example as shown in FIG. 19. Referring to FIG. 19, a loading motor for transporting the disk/disk holder and an up/down motor for moving vertically the lift unit 102 are designed to be controlled by a micro computer.

Various detection signals are supplied to the micro computer from a timer switch for detecting the insertion/ejection of the disk holder, a magazine switch for detecting the loading of the magazine, an interrupter for detecting vertical position of the lift unit 102, and the like. Among them, the interrupter is generally provided for verifying the vertical position of the lift unit 102 corresponding to each of the disk holders 107 in the disk changer. Accordingly, when the transit time at any interrupter position exceeds the normal transit time, it can be determined that the upward movement of the lift unit 102 is interfered.

[Operation and Effects]

In accordance with the present form having the configuration as in the foregoing, such operation as mentioned below is provided. When the magazine 106 is inserted into the disk changer, whether any disk holder 107 in the magazine 106 protrudes or not is determined easily and certainly by the vertical movement of the holder drawing member 111 which follows the vertical movement of the lift unit 102. If it is determined that the disk holder 107 protrudes, the protruded disk holder 107 is certainly pressed into the predetermined accommodation position in the magazine 106 by the combination of the vertical movement of the holder drawing member 111 which follows the vertical movement of the lift unit 102 and the horizontal movement of the holder drawing member 111.

Therefore, in accordance with the present form, if the disk holder 107 in the magazine 106 is not located at the predetermined accommodation position, the disk holder 107 is allowed to be properly accommodated in the predetermined accommodation position by the holder drawing member 111 after the magazine 106 is inserted in the disk changer. Therefore, good transporting operation of the disk holder 107 is ensured as well as in the abovementioned first form, and the disk holder 107 can be certainly transported to the predetermined position near the playback means.

Especially, in the present form, the holder drawing member 111 for drawing out the disk holder 107 is used as it is for the pressing means for forcefully pressing the disk holder 107 and the protrusion determination means for determining the protrusion of the disk holder 107, accordingly, the alignment of the holder drawing member 111 with disk holder 107 is easy, the operational reliability is good. What is more, the number of components is reduced compared with the case when a dedicated pressing means or dedicated protrusion determination means is provided, and therefore the configuration thereof can be simplified.

Third form

[Configuration]

Figure 20:
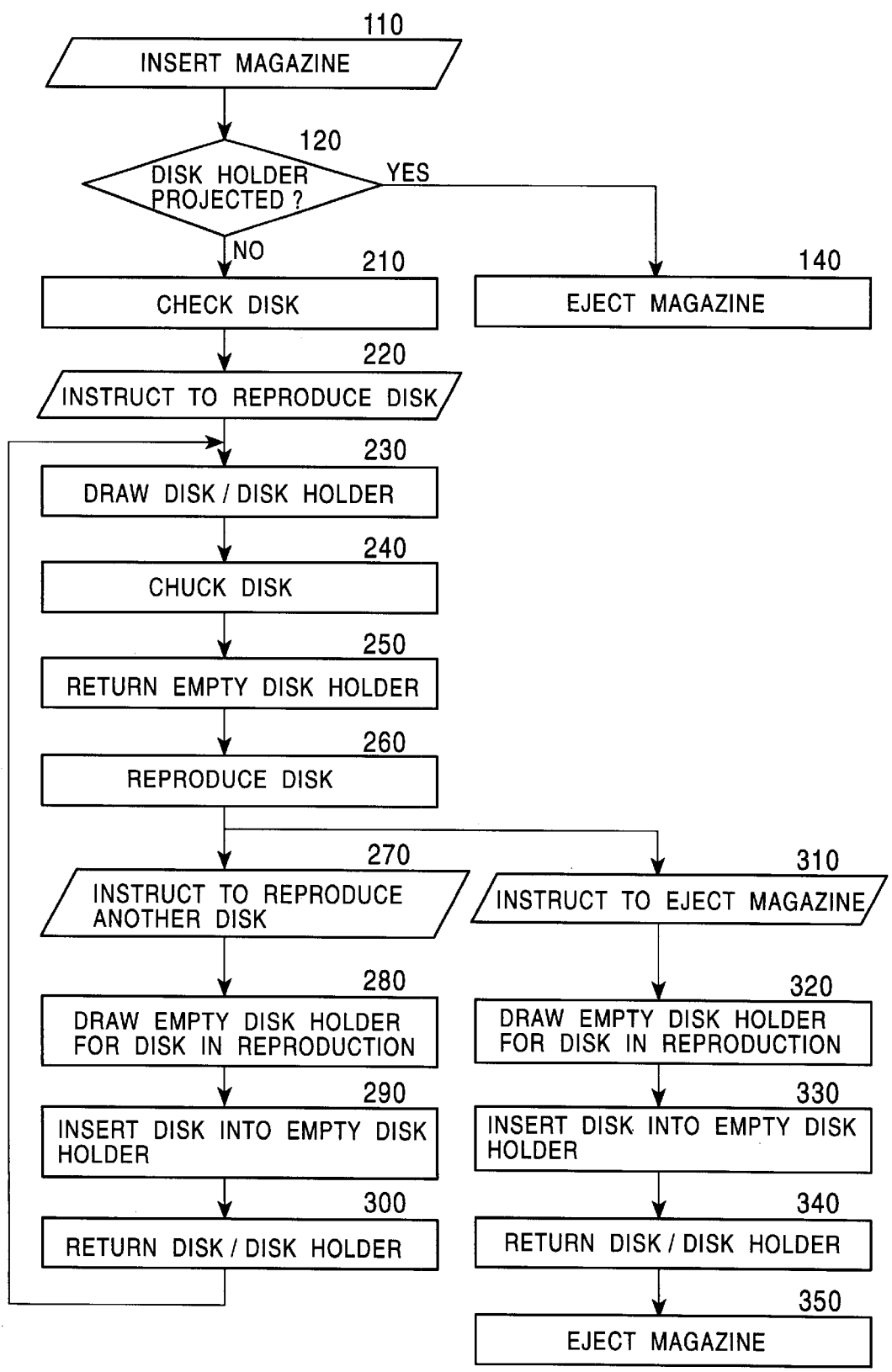
FIG. 20 is a flowchart used for explaining operation procedures of the third form of the disk changer device in accordance with the present invention.

FIG. 20 is a flowchart used for explaining the operational procedure of the third form of the disk changer in accordance with the second aspect of the present invention. The present form is adapted to eject the magazine 106 outside of the disk changer rather than perform the compulsive accommodation operation of the disk holder 107.

That is, in the operation of the disk changer of the present form, whether any disk holder protrudes or not is checked (Step 120), and if it protrudes, the magazine is ejected as it is (Step 140). Other operations than this magazine ejection operation including specific methods for checking protrusion of the disk holder are similar to those of the second form in the foregoing. As the ejection means for ejecting the magazine, any known means according to various methods is used as it is, and the description thereof is omitted herein.

[Operation and Effects]

In accordance with the present form having the configuration as in the foregoing, similar to the abovementioned second form, whether any disk holder 107 in the magazine 106 protrudes or not is determined easily and certainly by the vertical movement of the holder drawing member 111 which follows the vertical movement of the lift unit 102 when the magazine 106 is inserted into the disk changer. And, if it is determined that the disk holder 107 protrudes, the ejection of the magazine 106 inform the used of the improperly accommodated state.

Further, in the present form, it is not required to move the lift unit 102 and the holder drawing member 111 for the predetermined distance which is different from the normal operating distance as in the compulsive accommodation operation in the abovementioned second form, therefore, the present form can be easily implemented using an existing configuration. Besides, in the present form, it is necessary to correct the accommodated state of the disk holder 107 for the ejected magazine 106 by the user himself. However, the correction operation is just pressing the disk holder 107, which hardly affects its operativity.

Other forms

The second aspect of the present invention is not limited to the respective abovementioned forms, and other various modifications within the scope of the present invention can be implemented. First, in each of the form in the foregoing, the specific configuration, the positional relationship, and the like of the magazine, the disk holder, the drawing means, the playback means, the lifting means for vertically moving them, and the like can be optionally changed. For example, in each of the forms in the foregoing, descriptions are given to the case using a magazine in which disk holders of the type of holding one disk at each, however, the present invention is similarly applicable to the case using a magazine accommodating a disk tray as a disk holding unit on which a disk is placed.

In addition, a specially formed spring 106*b* and fixing projection 107*b* are used as the means for attracting a disk holding unit in the abovementioned first form, however, specific configuration of the attracting means of the disk holding unit may be optionally changed. Further, a configuration not provided with the attracting means of the disk holding unit is also allowable. When the attracting means of the disk holding unit is not provided as mentioned above, a high degree of dimensional accuracy is required between the magazine insertion opening and the disk holding unit. In such a case, however, the dimensional accuracy between the magazine insertion opening and the disk holding unit can be reduced by giving a resilient construction to the edge of the magazine insertion opening to allow the edge to protrude on the magazine side.

On the other hand, the operational procedures of the abovementioned second and third forms were described by way of example, and these operational procedures are allowed to be optionally changed. For example, instead of determining the protrusion of the disk holding unit by moving the holder drawing member 111 upward, it may be determined by moving the holder drawing member 111 downward. Further, the second and third forms were described regarding the cases using the mechanism of the first form, however, specific configuration of the mechanisms can be changed optionally, and, for example, various means other than the drawing member such as the holder drawing member 111 can be used as a protrusion determination means. Still further, the determination of the protrusion of the disk holding unit is not limited to some mechanical detection method but the determination can be freely carried out by various existing position detection methods such as an optical detection method, an electromagnetic method, and the like in combination or in single. In addition, as a pressing means for pressing a disk holding unit in a predetermined accommodation position, various means other than the drawing member such as a holder drawing member 111 can be used. Thus an appropriate operating procedure can be set depending on the configuration of the protrusion determination means, the pressing means, or the like as mentioned above.

Further, as a modification of the second form, it may be configured, for example, to make a determination of the protrusion of the disk holding units regularly or as necessary other than when inserting the magazine, and if the protrusion is determined, the disk holding unit is similarly pressed into the predetermined accommodation position. Such configuration is the most suitable for the disc changer installed in a vehicle which is susceptible to vibrations. That is, undesirable external forces such as vibrations or the like may cause the protrusion of the disk holding unit if the disk holding unit is properly accommodated in the accommodation position when the magazine is inserted. The disk holding unit can be returned to the predetermined accommodation position by appropriately determining the protrusion of the disk holding unit when the disk holding unit is subjected to such vibrations or the like, and thereby the subsequent improper operation can be surely prevented.

Further, the abovementioned third form is configured to eject the magazine as it is when the protrusion of the disk holding unit is determined, however, it is also possible to more clearly inform the user of the improperly accommodated state by an indication on an indicator, a sound, or the like together with the ejection of the magazine. In this case, a signal indicating the improperly accommodated state may be a signal which indicates the cause or nature of the trouble, or it is also possible to use a common warning signal which is same as for other various trouble conditions. In any way, the user can more certainly grasp the improper accommodation condition of the disk holding unit by supplying any signal. On the other hand, it is also possible to supply the user only the improperly accommodated state signal without ejecting the magazine and to allows the user to make the eject operation by himself. Further, the operation control method for stopping transferring to the disk playback operation when the protrusion of any disk holding unit is determined can be optionally selected, and, for example, it is also possible to simply stop the disk transporting operation.

The present invention is applicable to various disk apparatuses such as a CD-player, an LD-player, and an MD-player as long as the disk changer thereof is the type of inserting a magazine accommodating therein plural disk holding units, and remarkable effects as described regarding the various forms in the foregoing may be provided in any case.

As described above, in accordance with the second aspect of the present invention, when any disk holding unit in the magazine protrudes outward beyond the predetermined accommodation position, the improperly accommodated state can be corrected by determining the protrusion and operating the pressing means or by using the magazine insertion opening and mechanically pressing the disk holding unit into the predetermined accommodation position, and therefore a disk changer in which the disk holding units can be certainly transported to the predetermined position near the playback means. Further, in accordance with the present invention, a disk changer may be provided in which the occurrence of an improper operation can be prevented when any disk holder is not located in the predetermined position in the magazine by determining the protrusion of the disk holding unit and performing a motion control for stopping transferring to the playback operation.

A concrete description will now be given to forms of a disk changer device and a disk magazine device in accordance with the third or fourth aspect of the present invention referring to drawings.

[Disk Changer Device in Accordance with Third Aspect]

Figure 21:
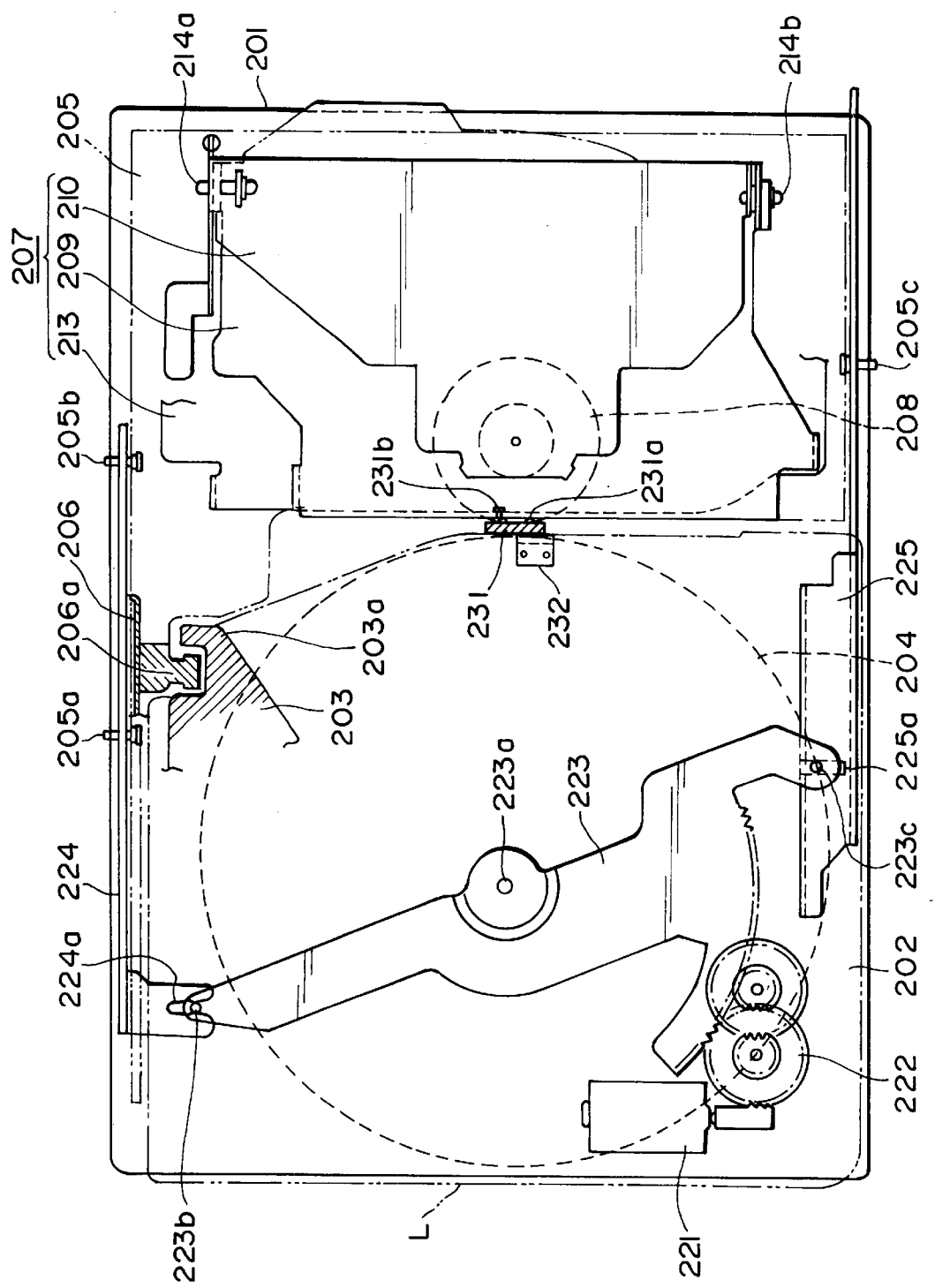
FIG. 21 is a plan view of one form of a disk changer device in accordance with the present invention.

FIG. 21 is a plan view of a disk changer in accordance with the third object of the present invention, schematically showing only plural main members at their initial position. While disk changer device shown in the figure is an end-loading type on-vehicle disk changer device wherein the loading direction of a magazine and a drawing direction of a disk holder is identical, it is of course that the disk changer device in accordance with the third aspect of the present invention may by that of other type. That is, as shown in FIG. 21, a magazine 202 is inserted through a magazine insertion opening L and loaded in the magazine loading section which is disposed in the left hand part in the drawing of the chassis (a fixed section) of the device, and the magazine accommodates a plural vertically stacked disk holders (disk holding unit) 203. Each of disk holders 203 is configured to hold a disk 204 which is inserted therein in the direction parallel to the main surface thereof, and each holder is provided with an engaging section 2031 for drawing operation at one end thereof.

Further, a lift unit (moving means) 205 is supported to be vertically movable with respect to the chassis 201 in the right part of the drawing in the chassis 201 of the device. This lift unit 205 consists of a combination of a holder drawing member (disk holding unit drawing section) 206 for drawing out the disk holder 203 and a playback unit (disk playback section) for reproducing a disk 204.

Among these components, the holder drawing member 206 is mounted on the chassis of the lift unit 205 to be movable in the disk transporting direction, i.e. a horizontal direction in the figure, and a fingernail-shaped projection 206a which engages with the engaging section 203a of a disk holder 203 is provided at one end of the holder drawing member 206. The lift unit 205 is adapted to be moved upward or downward according to a disk selection instruction in order to adjust the height of the holder drawing member 206 to be flush with the disk holder 203 holding the selected disk 204.

On the other hand, the playback unit 207 comprises a drive plate 209 having a rotatable turntable 208 on which a disk is mounted, a clamp arm 210 for chucking the disk 204 on the turntable 208, an upper plate 213 for supporting them, and the like. The upper plate 213 is a fixed member which is integrally fixed to the chassis of the lift unit 205, while the drive plate 209 and the clamp arm 210 are rotatable mounted to this upper plate 213 by means of axes 214a and 214b.

It is not shown but the chassis 201 of the device is contained in an outer case 211, supported against the outer case 211 via a damper 212, and therefore has a structure which enables isolation from the vehicle vibrations.

On the other hand, the disk changer device in accordance with the present form is configured to be loaded with a magazine which can accommodated 6 disks. As a structure for vertically moving the lift unit 205 to respective positions of 6 disks 204 when the magazine 202 is loaded, a shift motor 221, a gear mechanism 222, and a shift link 223 are disposed at the lower position of the chassis 201 under the magazine loading section, and a first and second plates 224 and 225 are slidably mounted on the both inner side surfaces of the chassis 201. In this case, the shift link 223 is movably provided around the axis 223a via the gear mechanism 222 by the driving force of the shift motor 221. Pins 223b and 223c which are provided at both rotatable free ends of the shift link 223 are inserted in grooves 224a and 225a of the first and second shift plates 224 and 225, respectively. These shift plates 224 and 225 slides in accordance with the rotating direction of the shift link 223, and thereby moves the lift unit 225 upward or downward.

Figure 22A:
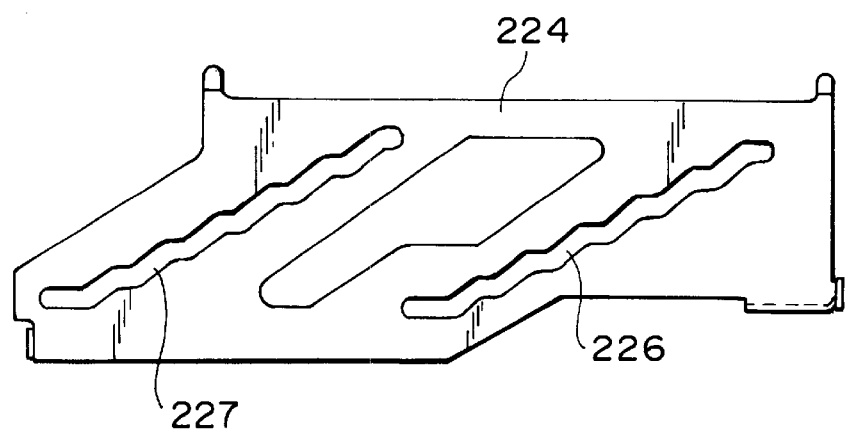
FIG. 22A is a side view showing a first shift plate shown in FIG. 21.
Figure 22B:
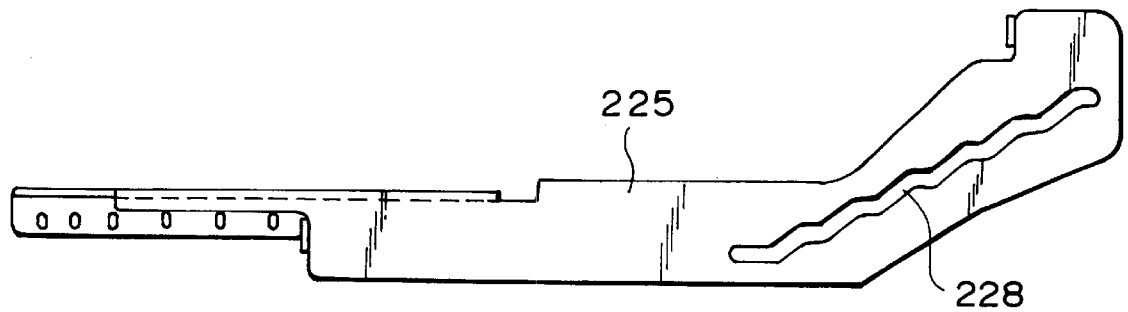
FIG. 22B is a side view showing a second shift plate shown in FIG. 21.

FIG. 22A and FIG. 22B are side views of the first and second shift plates, respectively. As shown in FIG. 2A, two stepwise cam grooves 226 and 227 are formed in the first shift plate 224, while as shown in FIG. 22B, one stepwise cam groove is formed in the second shift plate 225. Guide pins 205*a* to 205*c* provided on the chassis of the lift unit 205 as shown in FIG. 21 are inserted in the cam grooves 226 to 228, respectively. That is, the lift unit 205 vertically moves as the cam grooves 226 to 228 horizontally moves in synchronization with the horizontal sliding of the first and second shift plates 224 and 225, and thereby the lift unit 205 is adjusted to the height of any one of the disks in the magazine 202.

Figure 23A:
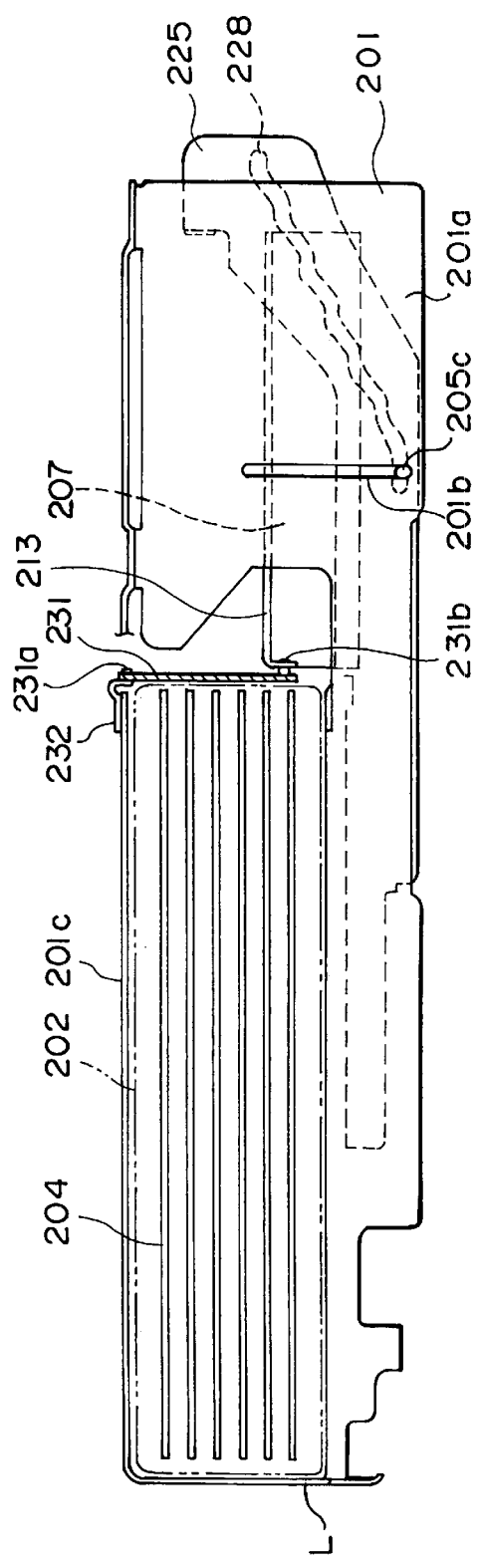
FIG. 23A is a side view of the disk changer device shown in FIG. 21 taken from the second plate side, showing a initial state that the playback unit is located at the lowermost position.
Figure 23B:
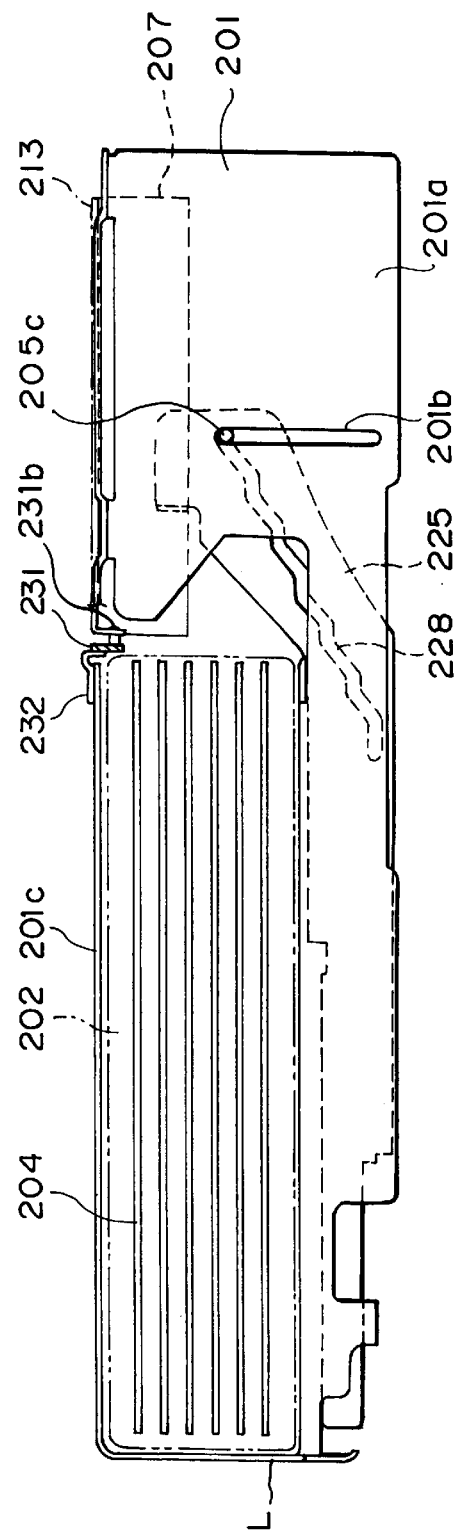
FIG. 23B is a side view showing a state that the playback unit is positioned to the uppermost disk.

FIG. 23A and FIG. 23B are side views of the disk changer device as seen from the second shift plate 225 side, FIG. 23A shows the initial state wherein the playback unit 207 is located at its lower most position, and FIG. 23B shows the state wherein the playback unit 207 is aligned with the upper most disk. In FIGS. 23A and 23B, for simplicity of the drawings, only the guide pin 205*c* and the playback unit 207 which is a part of the lift unit 205 are schematically shown without showing the general view thereof. As shown in these figures, there is provided a guide groove 201 which vertically extends in the side wall 201*a* of the chassis 201. The guide pin 205*c* of the second shift plate 225 is also inserted in this guide groove 201*b*, and thereby the horizontal position of the lift unit 205 with respect to the chassis 201 is controlled.

Further, as shown in FIGS. 23A and 23B, in addition to the configuration as in the foregoing, the disk changer device in accordance with the form of the present invention is further provided with a disk control link (disk control member) 231 near the side face on the drawing direction side of the magazine 202 which is loaded in the normal loading position. The side face on the drawing direction side of the magazine 202 is located at the position which is generally corresponding to the side face on the drawing direction side of the disk 204 accommodated in the magazine 202 when the disk 204 is located at the normal accommodation position thereof. That is, the disk control link 231 is disposed near the side face on the drawing direction side of the disk 204 located in the normal accommodation position.

Figure 24A:
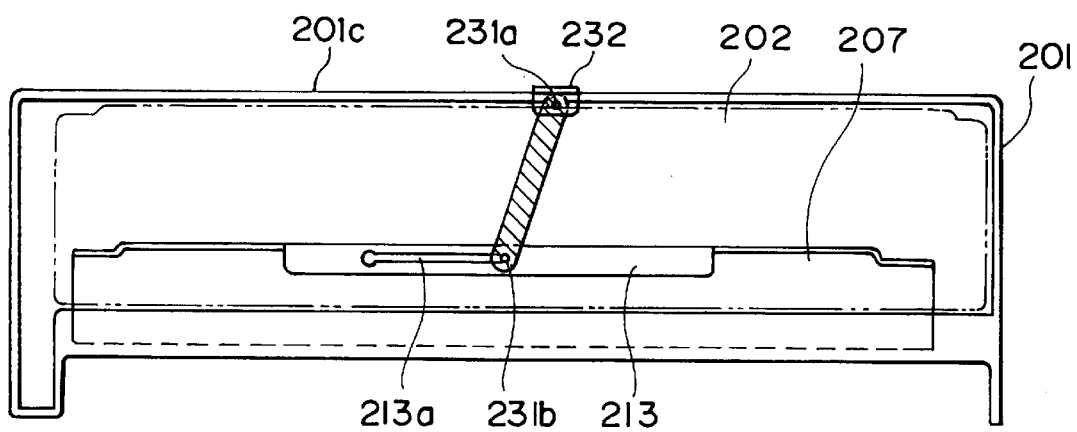
FIG. 24A is a view of the disk changer device shown in FIG. 21 taken from the magazine insertion opening side, showing a initial state that the playback unit is located at a lowermost position.
Figure 24B:
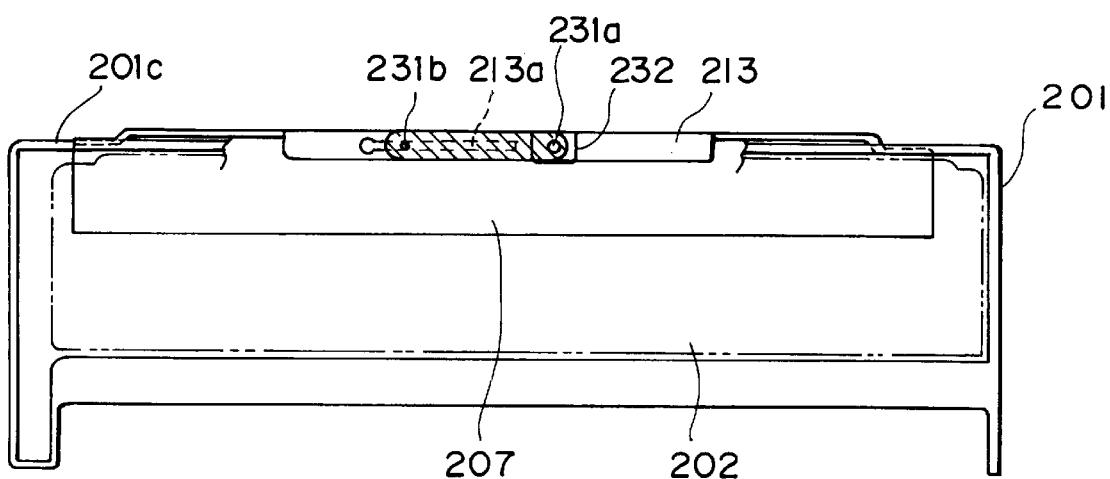
FIG. 24B is a side view showing a state that the playback unit is positioned to the upper most disk.

FIG. 24A and FIG. 24B are side views of the disk changer device as seen from the magazine insertion opening L side. FIG. 24A shows the initial state wherein the playback unit 207 is located at its lower most position, and FIG. 24B shows the state wherein the playback unit 207 is aligned with the upper most disk. In FIGS. 24A and 24B, for simplicity of the drawings, only the playback unit 207 which is a part of the lift unit 205 is schematically shown without showing the general view thereof. As shown in FIGS. 24A and 24B, a disk control link 231 is provided to connect the upper surface 201*c* and the chassis and the end on the magazine loading side of the upper plate of the playback unit 207.

That is, one end of the disk control link 231 is rotatably mounted to a mounting member 232, which is placed on the upper face 210*c* of the chassis 201, by means of an axis 231*a*. Besides, an engaging pin 231*c* is disposed at the other end of the disk control link 231, and inserted in an engaging groove 213*a* which is formed in the side surface of the upper plate and horizontally extends. Accordingly, the disk control link 231 is allowed to rotate in the range from the control position which extends vertically as shown in FIG. 24A to the horizontal position as shown in FIG. 24B in accordance with the vertical position of the playback unit 207.

More particularly, when the playback unit 207 is located at its lower most position in the initial state as shown in FIG. 23A, the disk control link 231 covers the whole disk 204 in the magazine at the abovementioned control position, and when the playback unit 107 is aligned with any optional disk 204 in the magazine 202 as shown in FIG. 23B, the drawing paths of the optional disk 204 and other disks 204 which are arranged lower than the optional disk are all released.

[Operation]

In accordance with the disk changer device having the configuration as mentioned above, a disk 204 can be controlled with respect to the normal accommodation position in the magazine 202 by the disk control link 231, therefore the popping of the disk 204 out of the magazine 202 can be certainly prevented. A description will be given to this point.

First, as shown FIG. 23A, the guide pin 205*c* of the lift unit 205 is located at the lower most end of the cam groove 228 of the shift plate 225, and the playback unit 207 is located at the lower most position in its vertical operating range. Accordingly, the disk control link 231 is located at a control position wherein all 6 disks 204 in the magazine 202 are covered and the paths of the 6 disks are all vertically blocked. In such a state, if the magazine 202 is forcefully inserted through the magazine insertion opening L and the disk 204 is nearly popped out from the disk holder 203, the side face of the disk 204 butts against the disk control link 231, therefore the disk will can not popped out from the magazine 202.

In this case, the disk 204 butting against the disk control link 231 is press returned in the disk holder 203 by the disk control link 231, and retracted to the normal accommodation position within the disk holder 203 by the disk retracting force belongs to the disk holder 203 itself.

That is, the disk holder 203 is generally provided with a retracting structure using a spring and the like for finally retracting the disk to the normal accommodation position when the disk holder 203 is inserted into a position near the normal accommodation position. Consequently, as shown in FIG. 23A, the disk 204 subjected to the position control of the disk control link 231 is allowed to be certainly inserted into the normal accommodation position using a disk retracting force of the disk holder itself by disposing the disk control link 23 a at a position near the side face of the disk 204 which is located in the normal accommodation position.

In addition, when reproducing the disk, the guide pin 205*c* of the lift unit 205 is located at a position corresponding to the selected disk in the cam groove 228 of the second shift plate 225, while the playback unit 207 is located at a position corresponding to the selected disk 204, as shown in FIG. 23B, therefore, the disk control link 231 releases the drawing paths of the selected disk 204 and the other disks 204 below this selected disk 204. FIG. 23B shows the case that the upper most disk 204 is selected and the drawing paths of all the disks 206 are released by way of example. In such a state, the disk loading operation of the selected disk 204 can be smoothly performed.

[Effects]

As described above, in accordance with the present form, the popping out of the disk 204 from the magazine 202 when inserting the magazine 202 can be efficiently and certainly prevented using the vertical movement of the lift unit 205 containing the playback unit by means of the chassis 201 of the disk changer device and the disk control link 231 disposed between the playback unit 207 and the upper plate 213. Therefore, problems such as the failed disk playback or the disk recovery failure resulting from the popping out of the disk 204 are not caused. Thus, the disk changer device with a high degree of operational reliability can be provided by the simple structure using the disk control link 231 as mentioned above.

[Disk Magazine Device in Accordance with Fourth Aspect]

Figure 25:
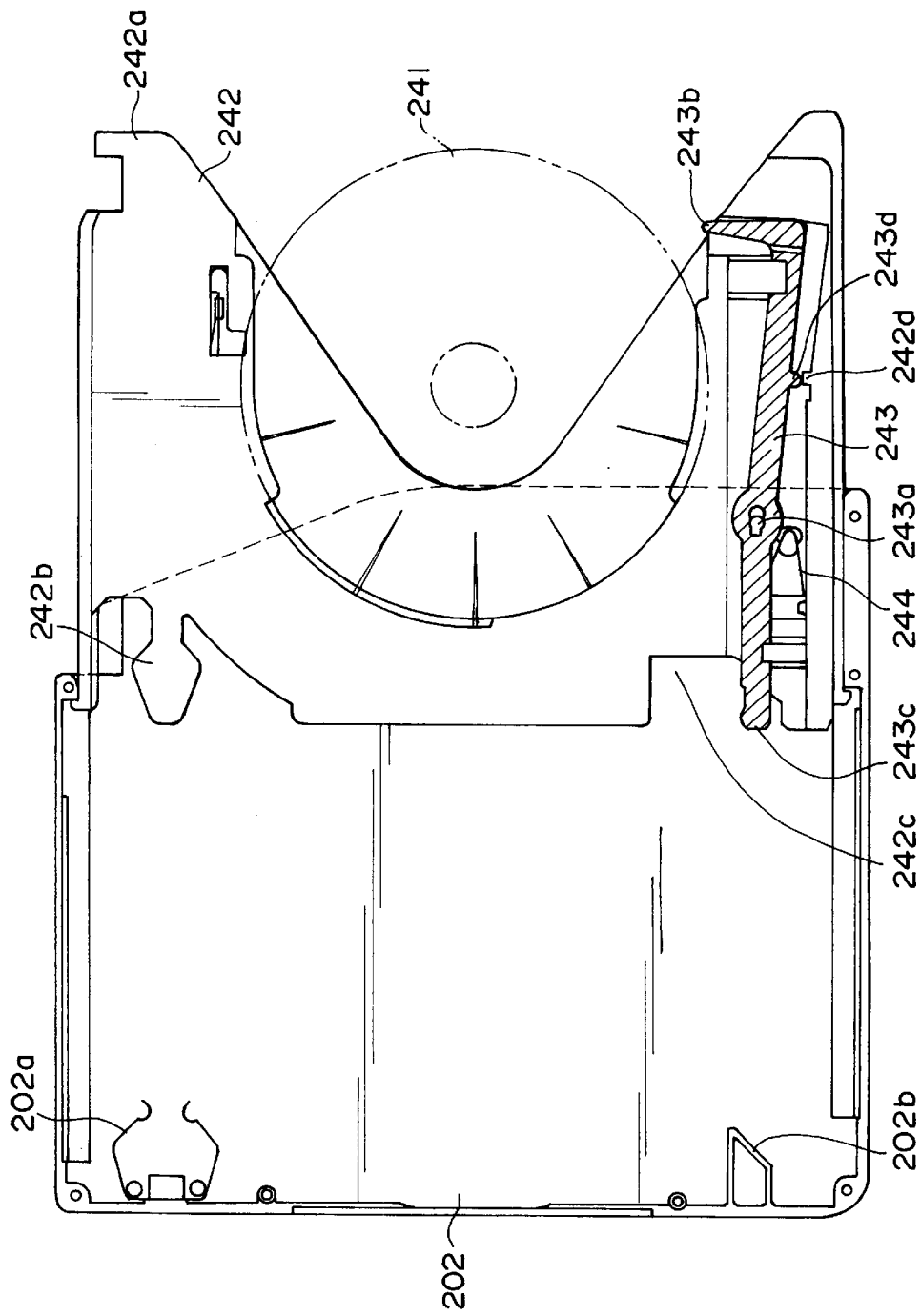
FIG. 25 is a plan view showing one form of a disk magazine device in accordance with the present invention, especially showing the state that the disk holder is drawn out from the magazine.
Figure 26:
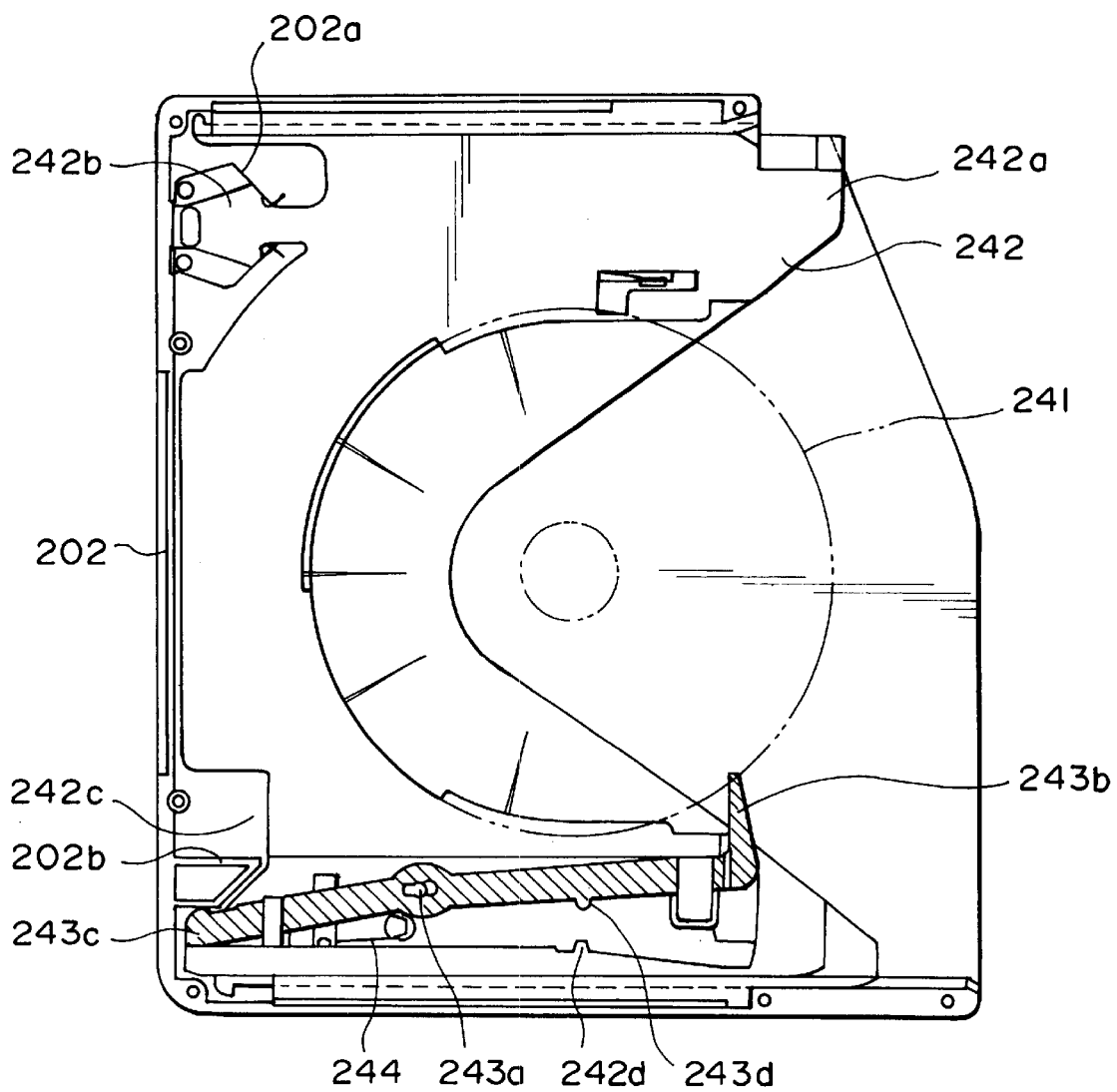
FIG. 26 is a plan view showing a disk magazine shown in FIG. 25, especially showing the state that the disk holder is accommodated in the magazine.
Figure 27:
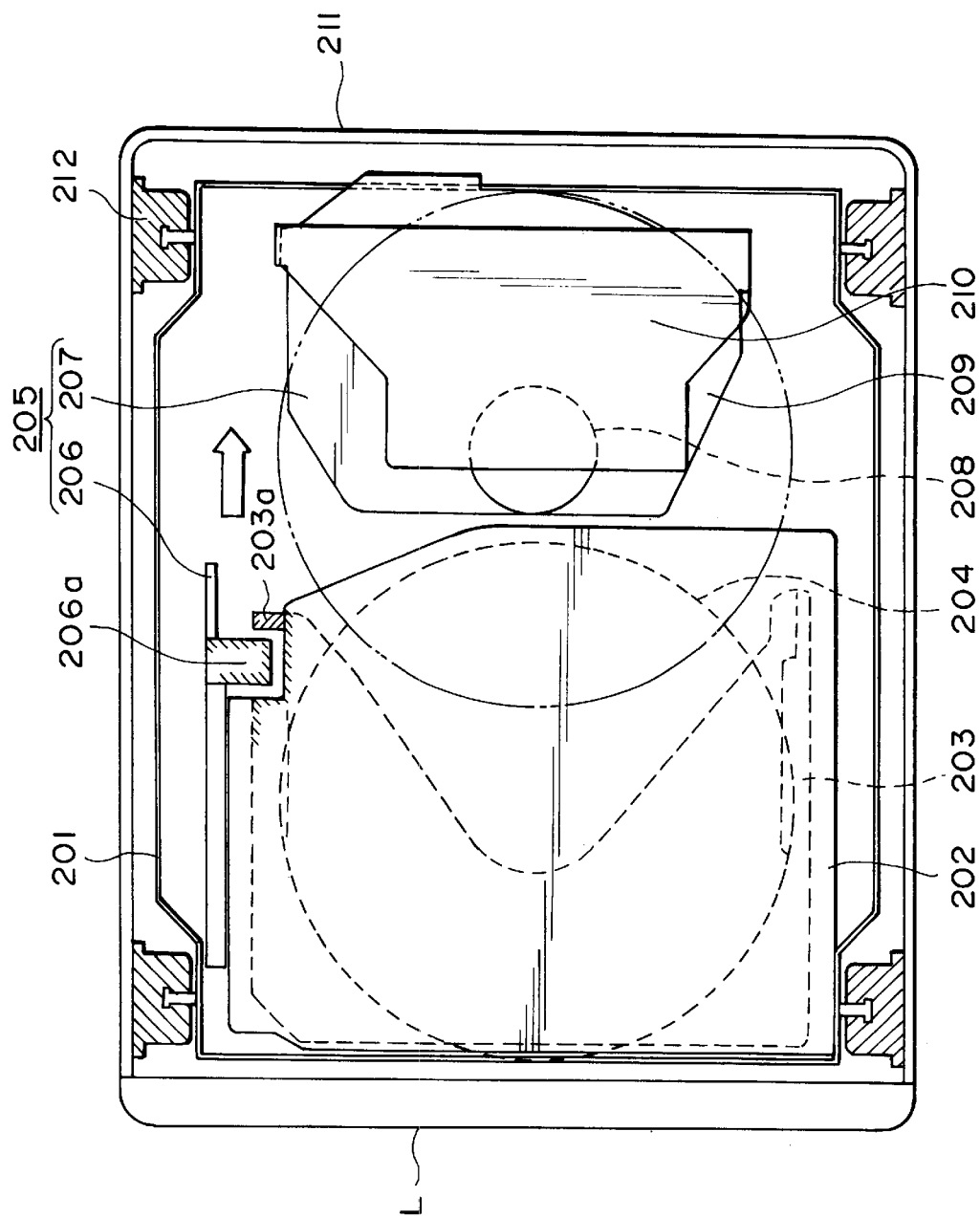
FIG. 27 is a plan view of a conventional disk changer device by way of example.

FIG. 25 and FIG. 26 show plan views of a disk magazine in accordance with the fourth aspect of the present invention, wherein plural different sized disks are accommodated: FIG. 25 shows the state that a disk holder is drawn out from the magazine; and FIG. 26 shows the state that the disk holders is accommodated in the magazine. That is, when only single size disks are accommodated in the magazine, the popping out of the disk can be prevented by providing a simple disk control member at the disk changer device as in the disk changer in the foregoing. However, when different size disks are accommodated in the magazine, it is difficult to prevent the popping out of the small size disks by means of the structure as in the disk changer device as in the foregoing. Then the present form relates to the structure for preventing the popping out of the small disks in the case as mentioned above.

As shown in FIG. 25, a disk holder 242 holding therein a small disk 241 is provided with an engaging section 242a for drawing operation at one end thereof on the drawing direction side, and further provided with a projection (control section) 242b which engaging with the magazine 202 at one end thereof on the inserting direction side into the magazine 202. The projection 242b is formed so that it has its widest portion at the middle thereof in the protruding direction, and becomes narrower toward the both ends thereof. At the other end on the inserting direction side into the magazine 202, a recess 242c including a sloped surface, whose position is controlled by the magazine 202 is provided. On the other hand, a pair of springs 202a between which a projection 242b of the disk holder 242 is clamped, and a projection 202b having a sloped surface for positioning the disk holder 242 by butting the sloped surface of the recess 242c of the disk holder 242. The combination of the pair of the springs 202a of the magazine 202 and the disk holder 242 functions as a disk retracting structure as in the abovementioned disk changer device.

In addition to the configuration as mentioned above, the present form further comprises a stopper arm (disk control member 243) for controlling a small size disk 241 with respect to the normal accommodation position, which is provided on one side surface of the disk holder 242 to be movable around the axis 243a. A stopper section 243 which is accessible to the drawing direction side face of the small diameter disk holder 241 located in the normal accommodation position is disposed at one end of the stopper arm 243. The stopper arm 243 is adapted to be rotated between the control position where the stopper 243b controls the small size disk 241 with respect to the normal accommodation position as shown in FIG. 26 and the releasing position where the stopper 243b departs from the small disk 241 and releases the drawing path thereof as shown in FIG. 25.

Further, at the other end of the stopper arm 243, there is provided an engaging section 243c which is controlled with respect to the control position as shown in FIG. 26 by the projection 202b of the magazine 202 when the disk holder 242 is accommodated in the magazine 202. Further, a projection 234d adapted to butt against the projection 242d which is formed on the side wall of the disk holder 242 is disposed between the stopper section 243b of the stopper arm 243 and the axis 243a. The end face position in the direction of releasing the stopper arm 243 is controlled by the positional relationship between these projections 242d and 243. The stopper arm 243 is always urged in the releasing direction by a releasing spring (urging means) 244. It is noted that urging force of the releasing spring 244 is made sufficiently smaller than the urging force of the spring 202a of the magazine 202.

[Operation]

In accordance with the disk magazine device having the configuration as in the foregoing, the small size disk 241 can be controlled with respect to the normal accommodation position in the disk holder 243 by the stopper arm 243 when accommodating the disk holder 242 into the magazine 202, therefore, the small disk 241 can be certainly prevented from popping out from the disk holder 243. A brief description will be given to this point.

When accommodating the disk holder 242 which holds therein a small size disk 241 in the magazine 202, the disk holder 242 is fully inserted into the normal accommodation position in the magazine 242 and becomes the state as shown in FIG. 26 owing to the disk retracting force which is produced from a combination of a pair of the springs 202d of the magazine 202 and the project 242b of the disk holder 242 by inserting the disk holder 242 to a position near the normal accommodation position in the magazine 202.

When inserting the disk holder 242 into the normal accommodation position in the magazine 202 as mentioned above, the engaging section 243c of the stopper arm 243 butts against the sloped surface of the projection 202b of the magazine and moves along this sloped surface in synchronization with the insertion of the disk holder, therefore, the stopper arm 243 rotates in the releasing direction with opposing the urging force of the releasing spring 244. At this time, the urging force of the releasing spring 244 acts in the direction outward of the magazine 202 to press return the disk holder 242. The urging force of the release spring 244 is made sufficiently smaller than the urging force of the spring 202a of the magazine 202, therefore the insertion of the disk holder 242 is not obstructed.

Then, as shown FIG. 26, the stopper arm 243 reaches a control position at a time when the disk holder 242 reaches the normal accommodation position in the magazine 202, and the small size disk 241 is controlled to the normal control position by the stopper section 243b of the stopper arm 243. At this time, the stopper arm 243 is securely fixed to the control position by the mechanical engagement with the magazine 202. That is, if the small size disk 241 is nearly popping out from the disk holder 242 because of the vibrations, impacts, or the like, the stopper arm 243 is certainly held at the control position and the small size disk 241 is surely controlled with respect to the normal accommodation position, therefore, there is no possibility that the small disk 241 pops out from the disk holder 242.

On the other hand, when reproducing the disk, the disk holder 242 is drawn out from the magazine as shown in FIG. 25, and thereby the stopper arm 243 reaches the releasing position to release the drawing path of the small size disk 241 by the urging force of the release spring 244. In the state as mentioned above, the smooth disk loading operation of the small size disk is ensured.

[Effects]

As described in the foregoing, in accordance with the present form, the popping out of the small size disk 241 from the disk holder 242 when disk holder 242 is accommodated in the magazine is certainly prevented using the engagement relationship between the magazine 202 and the disk holder 242 by means of the stopper arm 243 provided at the disk holder 242 and the project 202b provide at the magazine 202. Therefore, when this disk magazine device is loaded in the disk changer device, problems such as the failed disk playback or the disk recovery failure caused by the popping out of the disk 204 do not arise. Thus, the disk magazine device with a high degree of operational reliability can be provided by the simple structure using the stopper arm 243 as mentioned above.

Further, in accordance with the present form, the projection 202b for controlling the disk holder 242 with respect to the normal accommodation position is used for the control section for controlling the stopper arm as it is, therefore, the configuration thereof is simplified.

[Modifications]

The present invention is not limited to the abovementioned forms, and other various modifications may be made within the scope of the present invention.

In the first form, while there is described the case setting the lower most position in the vertical operation range as the initial position of the disk holding unit drawing section, the present invention is similarly applicable when setting the upper most position in the vertical operation range as the initial position of the disk holding unit drawing section. In this case, what is necessary is to provide a disk control member between the lower most portion of the fixed section of the device and the disk holding unit drawing member. Especially, as in the abovementioned disk changer device, when the lift unit 205 which is a combination of the disk holding unit drawing member such as a holder drawing member 206 and the playback unit 107 consisting of a disk playback section, what is necessary is to provide a disk control link 231 between the bottom face of the chassis 201 and the lower most portion of the playback unit 207.

Further, the disk changer device as mentioned above is configured to prevent the disk 204 from popping out by controlling the side face of the disk 204 with the disk controlling link 231, but the present invention is not limited to this configuration. That is, it is also possible to configure to prevent the disk holding unit by controlling the side face of the disk holding unit such as a disk holder 203 for holding therein a disk 204 or a disk tray for placing thereon a disk 204, in this case, a high degree of effectiveness can be obtained.

Still further, in the disk changer device as in the foregoing, there was described the case that the lift unit 205 which is a combination of the disk holding unit drawing section comprising the holder drawing member 206 and the like as mentioned above and the playback unit 207 consisting of the disk playback section, however, the present invention is also similarly applicable to the device in which the disk holding unit drawing section and the disk playback section are separated. In this case, what is necessary is to provide a disk control member between the disk holding unit drawing member and the fixed section of the device. However, as in the disk changer device mentioned above, a combination disk holding unit drawing section/disk playback section system is preferred because it increases a degree of flexibility in arrangement and contributes to simplify the configuration of the disk changer device.

Still further, in the disk changer device in accordance with the third aspect of the present invention, it is also possible to configure that the magazine is ejected from the magazine loading section when the disk holding unit drawing section reaches one of the vertical ends, that is, reaches the initial position. In this case, the disk control member can control the disk with respect to the normal accommodation position in the magazine when ejecting the magazine, therefore, the disk can be prevented from the protrusion or dropping from the magazine when ejecting the magazine, and thereby the degree of the operational reliability of the disk changer device is further increased.

Still further, in the disk magazine in accordance with the fourth aspect of the present invention, the projection 202b for controlling the disk holder 242 with respect to the normal accommodation position is also used as a control section for controlling the stopper arm 243 as it is, however, the control section for controlling the stopper arm 243 can be independently provided. In addition, it is also possible to modify this disk magazine device to provide one stopper arm for each of the disk holders for the plural different-sized disks, and thereby configures to prevent the popping up of each of disks.

Still further, it is also possible to configure a disk changer device which supports plural different-sized disks by combining the features of the disk changer device in accordance with the above mentioned third aspect and the features of the disk magazine device in accordance with the above mentioned fourth aspect. That is, it is also possible to configure that the disk control link provided at the disk changer device prevents the popping out of the largest size disk, while the stopper arm provided at the disk holder prevents the popping out each of the other smaller size disks.

On the other hand, some specific shape, number, and position of the disk control member of the present invention may be optionally selected. For example, in order to prevent the damage to the disk by the disk control member, it is also considered to cover the surface of the disk control member with an elastic material. Further, in the present invention, a specific configurations of the magazine, the magazine loading section, the fixed section, the disk holding unit drawing section, the moving member, the disk playback section and the like may be optionally selected.

Still further, the present invention is preferable for the end loading type on-vehicle devices as in the foregoing in that the influences from vibrations and impacts can be prevented. In addition, the present invention is applicable to various disk playback apparatuses adapted for the CD, LD, MD, and some combination thereof, and in any case, a high degree of effectiveness as mentioned above relating to respective forms can be achieved.

As described above, in accordance with the third and fourth aspects the present invention, there is provided a disk changer device supported by a high degree of operational reliability wherein the popping out of the disk from the magazine device when loading a magazine device can be prevented by disposing near the magazine loading section in the disk changer device a disk control member for controlling the disk with respect to the normal accommodation position. Further, there is provided a magazine device supported by a high degree of operational reliability wherein the popping out of the disk from the disk holding unit when accommodating the disk holder into the magazine can be prevented by providing a disk control member for controlling the disk with respect to the normal accommodation position thereof at the disk holding unit.

While the present invention has been described in detail as related to the embodiments, the descriptions of these embodiments are not intended to limit the scope of the present invention, and it is to be understood that various changes and modifications may be made in the present invention without departing from the scope of the appended claims.

What is claimed is:

1. In a disk playback apparatus that includes a magazine that accommodates a plurality of disks of different sizes that are operatively mounted on respective disk holding units, a playback unit for reproducing the information on a disk and a drawing out unit for selectively moving a holding unit with a disk to an operative position to reproduce the information on the disk, the improvement comprising:

a control member movably positioned adjacent the playback unit and contacted by the holding unit as it is drawn out by the drawing out unit, the control member includes a rotatable link member that pivots about an intermediate position on the link, the rotatable link member includes a holder butting pin on a first side of the intermediate position and a disk control pin on a second side of the intermediate position to force a disk to the chucking position, the holder butting pin positions the disk control pin at a first position for a disk of a first size and at a second position for a disk of a second size whereby the disk control pin contacts a peripheral portion of the disk on the disk holding unit to insure it is aligned properly with an operative position relative to the playback unit.

2. In the disk playback apparatus of claim 1, the control member is rotatably mounted and the holding unit has a cam configuration portion representative of the size of the disk on the holding unit for contacting the control member.

3. In the disk playback apparatus of claim 2, the control member is a rotatable link having a follower pin at one end for contacting the cam configuration portion.

4. In the disk playback apparatus of claim 3, the rotatable link includes a disk control pin offset from the follower pin for contacting and positioning the disk.

5. In the disk playback apparatus of claim 4, a biasing member positions the rotatable link so that the follower pin is biased to receive contact with the cam configuration portion.

6. In the disk playback apparatus of claim 4, a plurality of different cam configuration portions are provided in the magazine to accommodate different size disks on respectfully different disk holding units.

7. A disk changer device for different size disks comprising:

a housing member;

a magazine loading section into which a magazine can be loaded in a sliding direction into the housing member;

a plurality of disk holding units are movably mounted in the magazine loading section, one of the plurality of disk holding units holds a disk of a first size and at least another of the plurality of disk holding units holds a disk of a second size;

a disk holding unit drawing section for drawing a disk holding unit from the magazine loading section;

a disk playback section for reproducing a disk held in or placed on the disk holding unit which is drawn out by the disk holding drawing section; and a disk control member including a rotatable link member that pivots about an intermediate position on the link, the rotatable link member includes a holder butting pin on a first side of the intermediate position and a disk control pin on a second side of the intermediate position to force a disk to the chucking position, the holder butting pin positions the disk control pin at a first position for a disk of the first size and at a second position for a disk of the second size whereby the disk control pin is movably positioned depending on the disk size, wherein a disk holding unit holding a first size disk provides a stop member to limit the rotation of the rotatable link member and a disk holding unit holding a second size disk provides an engaging section to drive the holder butting pin away from the second size disk while the disk control pin drives the second size disk into an operative position relative to the playback unit.

* * * * *